United States Patent
Al Hamouz

(10) Patent No.: US 10,125,030 B1
(45) Date of Patent: *Nov. 13, 2018

(54) METHOD OF REMOVING HEAVY METAL IONS FROM WATER

(71) Applicant: King Fahd University of Petroleum and Minerals, Dhahran (SA)

(72) Inventor: Othman Charles Sadeq Al Hamouz, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 16/034,395

(22) Filed: Jul. 13, 2018

Related U.S. Application Data

(63) Continuation of application No. 14/712,097, filed on May 14, 2015, now Pat. No. 10,040,698.

(51) Int. Cl.
| | |
|---|---|
| *C02F 1/28* | (2006.01) |
| *B01J 20/26* | (2006.01) |
| *B01J 20/28* | (2006.01) |
| *C08G 14/06* | (2006.01) |
| *C02F 101/20* | (2006.01) |

(52) U.S. Cl.
CPC ............ *C02F 1/285* (2013.01); *B01J 20/264* (2013.01); *B01J 20/267* (2013.01); *B01J 20/28059* (2013.01); *C08G 14/06* (2013.01); *C02F 2101/20* (2013.01)

(58) Field of Classification Search
CPC ..... C02F 1/285; C02F 2101/20; B01J 20/264; B01J 20/28059; B01J 20/267; C08G 14/06
See application file for complete search history.

(56) References Cited

U.S. PATENT DOCUMENTS

| | | | | |
|---|---|---|---|---|
| 3,756,953 | A * | 9/1973 | Piasek | C07C 275/14 |
| | | | | 252/389.22 |
| 10,040,698 | B2* | 8/2018 | Al Hamouz | C02F 1/285 |
| 2005/0247635 | A1* | 11/2005 | Vo | B01D 53/02 |
| | | | | 210/685 |

FOREIGN PATENT DOCUMENTS

JP 63-386 1/1988

OTHER PUBLICATIONS

Pawan P. Kalbende, et al.; "Synthesis, Characterization and Non-isothermal Thermogravimetric Anaylsis of Cross-linked Phenol Based Copolymer Resins"; RJPBCS; Oct.-Dec. 2012; vol. 3/Issue 4; pp. 1276-1294.

P.K.P. Gaitry Chopra; Synthesis, Characterization and Metal Ion Binding Capacities of Resin Derived From P-Nitro Phenol, Hexamine and Formaldehyde; OIIRJ; May-Jun. 2014; vol. IV/Issue III; pp. 154-159.

* cited by examiner

*Primary Examiner* — Taiwo Oladapo
(74) *Attorney, Agent, or Firm* — Oblon, McClelland, Maier & Neustadt, L.L.P.

(57) ABSTRACT

Cross-linked terpolymers made up of phenol, diaminoalkane and formaldehyde monomeric units. The cross-linked terpolymers are synthesized via a Mannich mechanism in n-heptane, characterized with multiple spectroscopic techniques, scanning electron microscopy and powder X-ray diffraction, and are also investigated for their $Pb^{2+}$ adsorption capacity and thermodynamic properties. A method of removing $Pb^{2+}$ ions from an aqueous solution or a wastewater sample with these cross-linked terpolymers is also described.

13 Claims, 16 Drawing Sheets

METHOD OF REMOVING HEAVY METAL IONS FROM WATER

CROSS-REFERENCE TO RELATED APPLICATIONS

The present application is a Continuation of Ser. No. 14/712,097, now allowed, having a filing date of May 14, 2015.

BACKGROUND OF THE INVENTION

Technical Field

The present invention relates to cross-linked terpolymers. More particularly, the present invention relates to cross-linked terpolymers containing polymerized units of phenol, formaldehyde and alkyldiamine monomers, methods of preparing the terpolymers, and a method of removing metal ions from an aqueous solution by adsorbing the metal ions with the terpolymers, which is also used for treatment of real wastewater samples.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Toxic metal ions, such as lead ($Pb^{2+}$) have attracted a large attention and importance in recent years due to its hazardous effect on the human health and environment [C. Dulcy Evangelin, S. G. Gunasekaran, M. Dharmendirakumar, Asia-Pac. J. Chem. Eng. 8 (2013) 189-201; A. Atia, M. Donia, A. M. Yousif, Sep. Purif. Technol. 61 (2008) 348-357; S. Mandavi, M. Jalali, A. Afkhami, Chem. Eng. Commun. 200 (2013) 448-470—each incorporated herein by reference in its entirety]. The toxicity of lead arises from its non-biodegradable nature and can accumulate in the human body and cause hazardous effects, such as, nerve damage, anaemia, retarded foetal growth. Other effects are seen in children as they absorb and digest larger amounts of $Pb^{2+}$ ions than adults [P. L. Reagan, E. K. Silbergeld, (1989). Establishing a health based standard for lead in residential soils. In: Hemphill and Cothern, eds. Trace substances in environmental health, Supplement to Volume 12, (1990) of Environmental Geochemistry and Health—incorporated herein by reference in its entirety].

Several treatment methods have been utilized for the removal of heavy metal ions such as lead ions from aqueous solutions. Among these methods, adsorption is considered effective and economical. The adsorption by cross-linked polymers possesses flexibility in design and application as the cross-linked polymer can be functionalized by different chelating groups, regenerated and reused [A. Jakubiak, I. A. Owsik, B. N. Kolarz, React. Funct. Polym. 65 (2005) 161-167; B. N. Kolarz, A. Jakubiak, J. Jezierska, B. Dach, React. Funct. Polym. 68 (2008) 1207-1217; M. R. Maurya, S. Sikarwar, T. Joseph, P. Manikandan, S. B. Hlligudi, React. Funct. Polym. 65 (2005) 71-83; K. C. Gupta, A. K. Sutar, Polym. Adv. Technol. 19 (2008)186-200; K. C. Gupta, A. K. Sutar React. Funct. Polym. 68 (2008)12-26; M. Ruiz, A. M. Sastre, E. Guibal, React. Funct. Polym. 45 (2000)155-173; F. Fu, Q. Wang, J. Environ. Manage. 92 (2011) 407-418—each incorporated herein by reference in its entirety].

One class of cross-linked polymers is the phenol-formaldehyde polymer. Phenol-formaldehyde polymers can be modified to produce ion exchange resins with a variety of functional groups [F. Lawson and W. H. Jay. Ion exchange resin. U.S. Pat. No. 6,203,708, assigned to Monash University (Clayton, AU), Mar. 20 2001—incorporated herein by reference in its entirety]. Phenol-fomaldehyde polymers containing oxime chelating groups showed high adsorption capacity toward $Cu^{2+}$ ion removal [K. A. K. Ebraheem, S. T. Hamdi, React. Funct. Polym. 34 (1997) 5-10—incorporated herein by reference in its entirety], A salicylic acid-formaldehyde-catechol terpolymeric resin has been evaluated for the removal of Ni(II), Cu(II), Zn(II), Pb(II) and Cd(II) ions [R. R. Bhatt, B. A. Shah, (2013) Arab. J. Chem., http://dx.doi.org/10.1016/j.arabjc.2013.03.012 "in press"—incorporated herein by reference in its entirety], an anthranilic acid-formaldehyde-2-aminopyridine terpolymer has been synthesized and evaluated for the removal of Fe(III), Co(II), Ni(II), Cu(II), Zn(II) and Pb(II) [R. S. Azarudeen, R. Subha, D. Jeyakumar, A. R. Burkanudeen, Sep. Purif. Technol. 116 (2013) 366-377—incorporated herein by reference in its entirety].

Polymeric material based on phenol-formaldehyde can be used in a variety of applications. Such applications include insulation material, consolidated wood products, oil filters, abrasive binders, ion exchange membranes and carbon membranes upon carbonization [F. C. Dupre, M. E. Foucht, W. P. Freese, K. D. Gabrielson, B. D. Gapud, W. H. Ingram, T. M. McVay, R. A. Rediger, K. A. Shoemake, K. K. Tutin, J. T. Wright, Cyclic urea-formaldehyde prepolymer for use in phenolformaldehyde and melamine-formaldehyde resin-based binders. U.S. Pat. No. 6,379,814, assigned to Georgia-Pacific Resins, Inc. (Atlanta, Ga.), Apr. 30 2002; K. Lenghaus, G. G. Qiao, D. H. Solomon, Polymer 42 (2001) 3355-3362; N. Kishore, S. Sachan, K. N. Rai, A. Kumar, Carbon 41 (2003) 2961-2972—each incorporated herein by reference in its entirety].

There is a continuing need in the resin art for resins or polymers with novel monomers or novel combinations of monomers, to provide enhanced ion adsorption capacity and/or ion selectivity.

BRIEF SUMMARY OF THE INVENTION

According to a first aspect, the present invention relates to a cross-linked terpolymer comprising polycondensed units of phenol, diaminoalkane and formaldehyde. The diaminoalkane has a formula according to Formula 1:

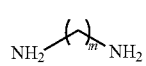

(Formula 1)

with m, representing an even number of carbon atoms in an alkyl chain, is 4, 6, 8 or 10. Each terminal amino group of the diaminoalkane unit bridges the aryl group of the phenol unit through a nitrogen-carbon-aryl linkage.

In one or more embodiments, the cross-linked terpolymer has a formula according to Formula 2:

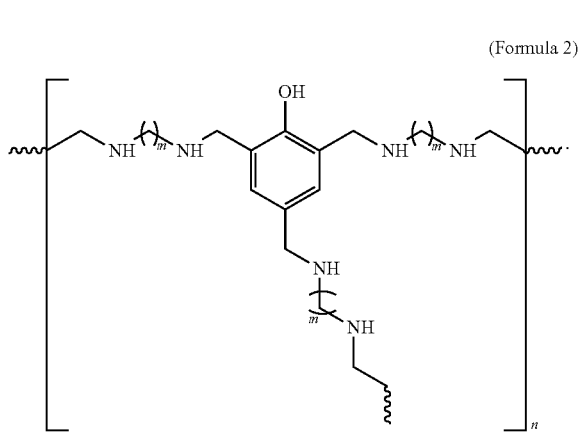

(Formula 2)

In Formula 2, n, representing the number of repeating units of the cross-linked terpolymer, is 10 to 10000.

In one or more embodiments, the phenol, diaminoalkane and formaldehyde are present in the cross-linked terpolymer at a molar ratio of 1:2.5-3:y and y≥6.

In one or more embodiments, the diaminoalkane is selected from the group consisting of substituted and unsubstituted butane, hexane, octane and decane.

In one or more embodiments, the cross-linked terpolymer further comprises one or more metal ions coordinated to one or more nitrogen atoms of the cross-linked terpolymer.

In one or more embodiments, the cross-linked terpolymer or a solid material synthesized therefrom has a surface area of 0.01-0.15 $m^2$ $g^{-1}$.

In one or more embodiments, the cross-linked terpolymer has an average molecular weight of 1,500-350,000 g/mol.

According to a second aspect, the present invention relates to a method of removing $Pb^{2+}$ ions from an aqueous solution. The method comprises contacting the aqueous solution with an adsorbent comprising the cross-linked terpolymer according to the first aspect of the invention.

In one or more embodiments, the contacting is carried out at a temperature of 25-50° C.

In one or more embodiments, the contacting is carried out at pH 5-6.

In one or more embodiments, the contacting is carried out for 1-5 h.

In one or more embodiments, the cross-linked terpolymer has a $Pb^{2+}$ adsorption capacity of at least 10 mg $L^{-1}$ based on the total volume of the aqueous solution.

In one or more embodiments, the cross-linked terpolymer has a $Pb^{2+}$ maximum adsorption capacity of 1-250 mg $g^{-1}$ based on the total weight of the cross-linked terpolymer.

In one or more embodiments, the contacting removes at least 85% of the $Pb^{2+}$ ions present in the aqueous solution.

In one or more embodiments, one or more $Pb^{2+}$ ions are coordinated to one or more nitrogen atoms of the adsorbent after the contacting.

According to a third aspect, the present invention relates to a method of preparing the cross-linked terpolymer according to the first aspect of the invention. The method comprises polycondensing phenol, diaminoalkane and formaldehyde to form a terpolymer and curing the terpolymer to form the cross-linked terpolymer.

In one or more embodiments, the polycondensing is carried out by stirring and heating a mixture comprising the phenol, the diaminoalkane, the formaldehyde and a reaction medium to 85-95° C.

In one or more embodiments, the reaction medium is n-heptane.

In one or more embodiments, the method further comprises removing at least one metal ion selected from the group consisting of Co, Cu, Zn, As, Sr, Mo, Cd and Hg from the aqueous solution.

In one or more embodiments, the curing is carried out by continuously stirring the terpolymer at 85-95° C. for 8-24 h.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
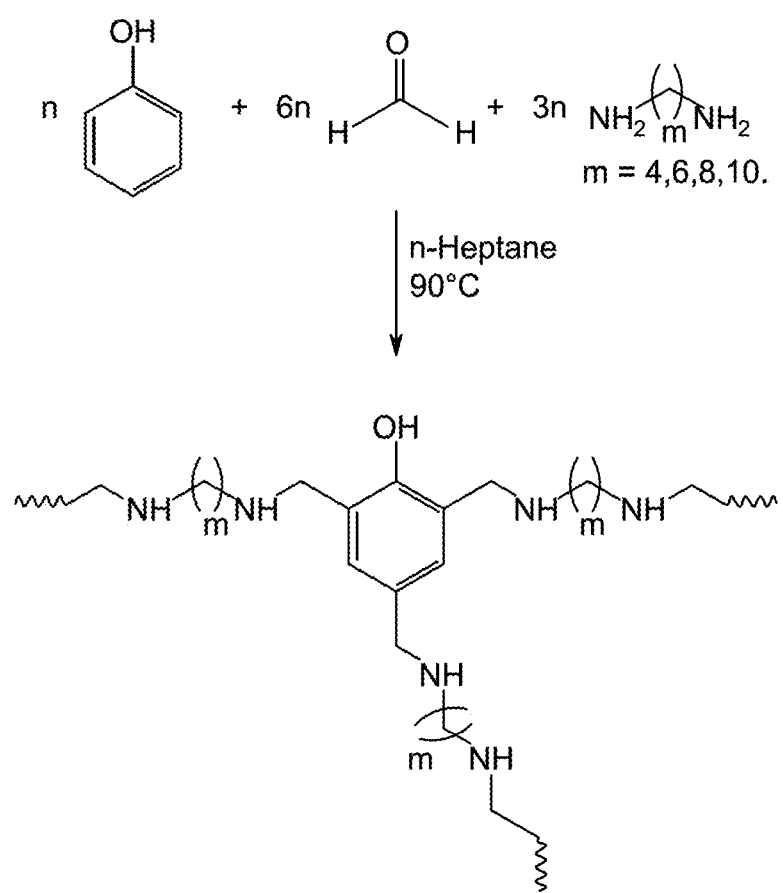
FIG. 1 illustrates a process of synthesizing cross-linked terpolymers according to at least one embodiment of the present invention.

Referring now to the drawings, wherein like reference numerals designate identical or corresponding parts throughout the several views.

The present invention relates to cross-linked terpolymers having polycondensed phenol, diaminoalkane (or alkyldiamine) and formaldehyde monomeric units, the diaminoalkane having the following Formula 1:

(Formula 1)

with m=4, 6, 8, 10. Therefore, the diaminoalkane in the cross-linked terpolymer can be diaminobutane (Buta), diaminohexane (Hexa), diaminooctane (Octa) or diaminodecane (Dec).

As can been seen in Formula 1, the alkyl chain of the alkyldiamine is flanked by two terminal amino groups. The alkyl chain, selected from the group consisting of butane, hexane, octane and decane, can be substituted or unsubstituted.

In certain embodiments, a cross-linked terpolymer according to the present invention has the following Formula 2:

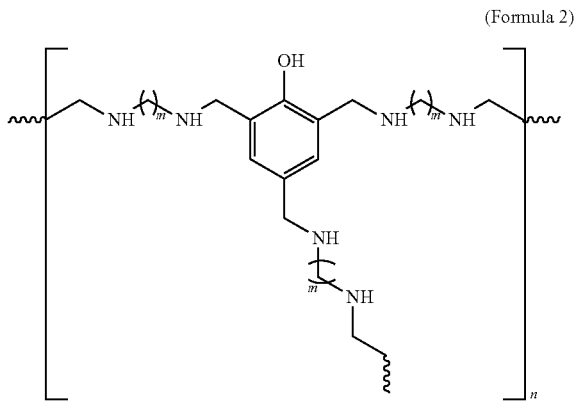

(Formula 2)

where each terminal amino group of the diaminoalkane unit (as described above) bridges the aryl group of the phenol unit through a nitrogen-carbon-aryl linkage. In at least one embodiment, three amino terminated alkyl bridges (from three diaminoalkane units) are bonded to one central phenol group through a single carbon atom (e.g., derived from formaldehyde) at the ortho and para positions of the phenol group. The number of repeating units of a monomer unit having a single phenolic group is represented by "n" which may be an integer of from greater than 1 to 10000, preferably from 10 to 5000, 20 to 2500, 25 to 1500, or 100 to 1000.

In one or more embodiments, phenol, diaminoalkane and formaldehyde are present in a terpolymer molecule in a molar ratio of 1:x:y, wherein x=1-5 and y≥6. For example, the molar ratio can be 1:1-5:6-100. In one embodiment, the phenol:diaminoalkane:formaldehyde molar ratio is 1:3:6.

In some embodiments, the cross-linked terpolymer is selected from the group consisting of phenol-formaldehyde-diaminobutane (Ph-Buta), phenol-formaldehyde-diaminohexane (Ph-Hexa), phenol-formaldehyde-diaminooctane (Ph-Octa) and phenol-formaldehyde-diaminodecane (Ph-Deca).

For purposes of the present inventions, "cross-linked" or "network" or "thermoset" polymers refer to natural or synthetic polymers and resins that contain branches that connect polymer chains via covalent bonds. The cross-linking can alter the physical and mechanical properties of the polymer. The vulcanization of rubber, for example, results from the introduction of short chains of sulfur atoms that link the polymer chains in natural rubber. As the number of cross-links increases, the polymer becomes more rigid.

In certain embodiments, the hardness of a terpolymer according to the present invention can vary from hard to rubbery-like and flexible, which can be correlated to the length or number of carbon atoms in the alkyl chain of the diaminoalkane. Accordingly, the longer the alkyl chain, the more flexible a terpolymer will be. In some embodiment that alkyl chain may have more the 10 carbon atoms, e.g., 12, 14, 16, 18 or 20 carbon atoms.

In some embodiments, the morphology of a terpolymer synthesized according to the present invention can vary between spherical white pellets and a single white, large lump. This is also correlated to the length or number of carbon atoms in the alkyl chain of the diaminoalkane. Accordingly, alkyl chains of ≥8 carbon atoms (e.g. octane and decane) produce spherical, white pellets while alkyl chains of <8 carbon atoms (e.g. hexane and butane) produce single, large lumps.

The surface area of a cross-linked phenol-formaldehyde-diaminoalkane terpolymer according to the present invention or a solid material synthesized therefrom is within the range of 0.01-0.15 $m^2$ $g^{-1}$, preferably 0.02-0.10 $m^2$ $g^{-1}$, more preferably 0.02-0.08 $m^2$ $g^{-1}$.

In at least one embodiment, one or more metal ions are coordinated to one or more nitrogen atoms of the terpolymer. The metal ions that are coordinated to the terpolymer are preferably heavy metal ions have a 2+ charge including $Pb^{2+}$, $Mn^{2+}$, $Fe^{2+}$, $Co^{2+}$, $Ni^{2+}$, $Cu^{2+}$, $Sn^{2+}$ and $Cd^{2+}$ but may include $Be^{2+}$ and/or $Zn^{2+}$.

In at least one embodiment, the metal ions that are coordinate to the terpolymer include but are not limited to Co, Cu, Zn, As, Sr, Mo, Cd, Hg and Pb.

In one or more embodiments, the average molecular weight of a terpolymer according to the present invention is in the range of including but not limited to 1,500-350,000 g/mol, 2,500-300,000 g/mol, 3,000-100,000 g/mol, or 5,000-50,000 g/mol.

In one or more embodiments, a terpolymer composition comprising the terpolymer exhibits a degree of crystallinity of 70-90%, preferably 73-87%, more preferably 75-85%. The degree of crystallinity, calculated as (Area under crystalline peak(2θ~20)/total area under the curve)×100%, can be measured by an X-ray diffraction technique such as powder X-ray diffraction.

The present invention also relates to methods of preparing the cross-linked terpolymers described above. In one embodiment, the polymerization is achieved through polycondensation of phenol, diaminoalkane and formaldehyde (in a molar ratio of 1:x:y, x=1-5 and y≥6, for example 1:1-5:6-100) via a Mannich reaction in a reaction medium. The reaction medium can be either an aqueous medium or an organic solvent, such as ethanol, methanol, water, acetic acid, saturated and unsaturated hydrocarbons such as alkanes and alkenes. In one embodiment, the reaction medium is n-heptane.

For purposes of the present invention, a Mannich reaction refers to a multi-component condensation of a nonenolizable aldehyde (e.g. formaldehyde), a primary or secondary amine or ammonia and an enolizable carbonyl compound to afford an aminomethylated product, which is also sometimes called a Mannich base. The Mannich reaction is usually a two-step reaction: addition of the amine group to the carbonyl carbon of the formaldehyde to form an electrophilic immonium or iminium ion followed by attack of the electrophile by the enolizable carbonyl compound.

Phenol, diaminoalkane and formaldehyde according to the aforementioned molar ratio are mixed in the reaction medium then stirred and heated until the temperatures reaches 80-100° C., preferably 85-95° C., for example, 90° C. A curing process takes place when the mixture is kept at the reached maximum temperature for at least 8 h, preferably at least 16 h, more preferably at least 24 h with continuous stirring. As used herein, curing refers to the toughening or hardening of a polymer material by cross-linking of polymer chains, brought about by agents such as electron beams, heat, chemical additives and UV radiation. Accordingly, methods of preparing a phenol-fonnaldehyde-diaminoalkane cross-linked terpolymer in the present invention are not limited by the use of heat in the curing process. Due to a formaldehyde/phenol ratio of >1, the curing process does not require a cross-linking agent. After the curing process has been completed, the polymer or resinous material produced can be filtered, crushed, washed and dried.

The methods of preparing cross-linked terpolymers described herein have a product yield of at least 70%, preferably at least 75%, for example, 75-85%. The product yield is calculated as (mass of product/mass of reactants)× 100%.

Further, the present invention relates to a method of removing $Pb^{2+}$ ions from an aqueous solution by adsorbing the $Pb^{2+}$ ions with a cross-linked phenol-formaldehyde-diaminoalkane terpolymer in both batch mode and fixed-bed or column mode.

In one or more embodiments, the cross-linked phenol-formaldehyde-diaminoalkane terpolymer adsorbent is present in the aqueous solution within a concentration range of 0.1-5.0 g $L^{-1}$ (per volume of the treated aqueous solution), preferably 0.5-2.5 g $L^{-1}$, more preferably 1.0-2.0 g $L^{-1}$.

In one or more embodiments, the aqueous solution is within a pH range of 4-6, preferably 5-6.

In one or more embodiments, a cross-linked phenol-formaldehyde-diaminoalkane terpolymer of the present invention is effective in adsorbing $Pb^{2+}$ ions in an aqueous solution within a temperature of 25-50° C., preferably 35-50° C., more preferably 40-50° C.

In one or more embodiments, the adsorption of $Pb^{2+}$ ions by a cross-linked phenol-formaldehyde-diaminoalkane terpolymer of the present invention in an aqueous solution is carried out for a duration of 1-5 h, preferably 2-5 h, more preferably 3-5 h. More than 85% of the $Pb^{2+}$ ions present in the aqueous solution will be successfully removed, preferably more than 90%, more preferably more than 95%, even more preferably more than 99.9%. Advantageously, more than 70% of the $Pb^{2+}$ ions are removed within the first hour.

In one or more embodiments, the $Pb^{2+}$ adsorption capacity of a cross-linked phenol-formaldehyde-diaminoalkane terpolymer increases when the initial concentration of $Pb^{2+}$ ions in the aqueous solution increases. The initial concentration of $Pb^{2+}$ ions in the aqueous solution is in the range of 50-136 mg $L^{-1}$, preferably 84-136 mg $L^{-1}$, more preferably 110-136 mg $L^{-1}$.

In one or more embodiments, the $Pb^{2+}$ adsorption capacity of a cross-linked phenol-formaldehyde-diaminoalkane terpolymer increases when the number of carbon atoms in the alkyl chain of diaminoalkane decreases. For example, at pH 5, 25° C., for a duration of 4 h and at a terpolymer concentration of 1.5 g $L^{-1}$, the $Pb^{2+}$ adsorption capacities of Ph-Buta, Ph-Hexa, Ph-Octa and Ph-Deca are 84-88 mg $L^{-1}$, 48-52 mg $L^{-1}$, 24-28 mg $L^{-1}$ and 12-16 mg $L^{-1}$, respectively. Overall, a cross-linked phenol-formaldehyde-diaminoalkane terpolymer of the present invention has a $Pb^{2+}$ adsorption capacity of 10-90 mg $L^{-1}$ under the described conditions.

In one or more embodiments, the maximum adsorption capacity of metal ions on the cross-linked phenol-formaldehyde-diaminoalkane terpolymer is within the range of 1-250 mg $g^{-1}$, preferably 10-250 mg $g^{-1}$, more preferably 30-250 mg $g^{-1}$.

In one or more embodiments, the cross-linked phenol-formaldehyde-diaminoalkane terpolymer adsorbent is also effective in removing, apart from Pb, other metal ions such as Co, Cu, Zn, As, Sr, Mo, Cd, and Hg from a wastewater sample.

The examples below further illustrate protocols for preparing and characterizing the cross-linked terpolymers described herein, and are not intended to limit the scope of claims.

Example 1

Materials and Equipment

Phenol (Ph), paraformaldehyde, 1,4-diaminbutane (Buta), 1,6-diaminohexane (Hexa), 1,8-diaminooctane (Octa) and 1,10-diaminodecane (Deca) from Fluka Chemie AG (Buchs, Switzerland) were used as received. All solvents used were of analytical grade.

Infrared spectra were recorded on a Perkin Elmer 16F PC FTIR spectrometer using KBr Pellets in the 500-4000 $cm^{-1}$ region. $^{13}C$-NMR solid state spectra were recorded on a Bruker WB-400 spectrometer with an operating frequency at 100.61 MHz (9.40 T). Samples were packed into 4 mm zirconium oxide rotors at 25° C. Cross-polarization was employed. Pulse delay of 5.0 s and contact time was 2 ms in CPMAS experiments. Magic angle spinning rate was 4 KHz. Carbon chemical shifts were referenced to tetramethylsilane using the high frequency isotropic peak of adamantine to 38.56 ppm. Scanning electron microscopy (SEM) images were taken by TESCAN LYRA 3 (Czech Republic) equipped with an energy-dispersive X-ray spectroscopy (EDX) detector model X-Max. Atomic absorption spectroscopy (AAS) analysis was performed using AAS model iCE 3000 series (Thermo Scientific). Thermogravimetric analysis (TGA) was performed using a thermal analyzer (STA 429) by Netzsch (Germany). The experiment was performed in a nitrogen atmosphere from 20-800° C. with a heating rate of 10° C./min with a nitrogen flow rate of 20 mL/min. X-ray analysis were performed on Rigaku Rint D/max–2500 diffractometer using Cu Kα radiation (wave length=1.5418 A)

Example 2

Synthesis of Cross-Linked Terpolymers

The cross-linked terpolymers were prepared for the first time as outlined in FIG. 1, with 0.01 mol of phenol, 0.03 mol of diaminoalkane and 0.06 mol paraformaldehyde in 30 ml n-heptane as reaction medium. These reaction components were mixed and stirred using a magnetic stirrer. When the temperature of the reaction mixture reached 60° C., a white resinous material was formed. The heating of the reaction mixture was continued until the temperature was increased slowly to 90° C. Then, the reaction mixture was kept at 90° C. for 24 h or overnight with continuous stirring, and left to cure under such conditions. Upon completion of reaction the resinous material was filtered, crushed and left to stir for another 24 h in distilled water. Then, the product was filtered and washed again with ethanol and dried under vacuum at 60° C. until constant weight was achieved. The results obtained are shown in Table 1.

TABLE 1

Mannich condensation terpolymerization[a] of phenol-formaldehyde-alkyldiamine terpolymers.

| Terpolymer | Yield (%)[b] | Calculated (%) | | | | Observed (%) | | |
| --- | --- | --- | --- | --- | --- | --- | --- | --- |
|  |  | C | H | N | O | C | H | N |
| Ph-Buta | 84 | 66.01 | 11.08 | 19.25 | 3.66 | 66.52 | 10.54 | 18.78 |
| Ph-Hexa | 77 | 69.18 | 11.61 | 16.14 | 3.07 | 68.76 | 11.08 | 16.27 |
| Ph-Octa | 78 | 71.47 | 12.00 | 13.89 | 2.64 | 71.68 | 11.80 | 14.12 |
| Ph-Deca | 81 | 73.20 | 12.29 | 12.19 | 2.32 | 72.75 | 12.09 | 12.33 |

[a]Polymerization reactions were carried out using 0.01 mol of phenol, 0.03 mol of alkyldiamine and 0.06 mol of paraformaldehyde in 30 ml n-heptane at 90° C. for 24 h.
[b]Yield (%) = (mass of product/mass of reactants) × 100%.

The hardness of the synthesized terpolymers varied from hard to rubbery-like material, which could be explained based on the length of the aliphatic chain of the diaminoalkane. 1,4-diaminobutane based cross-linked terpolymer showed harder resin. On the other hand, 1,10-diaminodecane based resin showed rubbery-like material, the larger amount of alkyl/aromatic ratio led to more flexible and rubbery like cross-linked terpolymer. During the synthesis process, the cross-linked terpolymers based on longer alkyl chains (1,8-diaminooctane and 1,10-diaminodecane) formed spherical pellets compared with short alkyl chain (1,4-diaminobutane and 1,6-diaminohexane) that formed one large lump.

Figure 2:
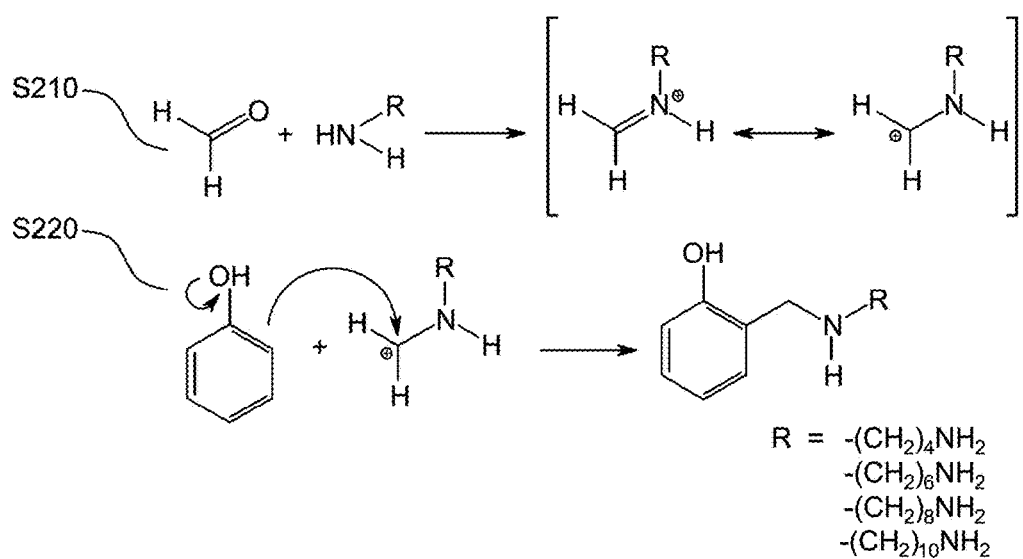
FIG. 2 illustrates the Mannich reaction mechanism taking place during the terpolymer synthesis process of FIG. 1.

The synthesis process of the terpolymers proceeded via a Mannich type reaction mechanism as shown in FIG. 2. At step S210, the addition of the amine group to the carbonyl carbon of the formaldehyde formed the immonium ion. At step S220, the immonium ion was then attacked by the phenol from ortho- and para-positions by the directing hydroxyl group. The polymer formation depended on the amount of formaldehyde added: 0.06 mol of formaldehyde was added (3 times more than diaminoalkane) to allow the reaction to proceed toward the formation of the cross-linked terpolymers [S. G. Subramaniapillai, J. Chem. Sci. 125 (2013) 467-482—incorporated herein by reference in its entirety].

Example 3

Characterization of Terpolymers

The synthesized terpolymers (Ph-Buta, Ph-Hexa, Ph-Octa and Ph-Deca) were characterized using a variety of techniques, including FTIR (Fourier transform infrared) spectroscopy, solid state $^{13}$C-NMR spectroscopy, thermogravimetric analysis TGA) and powder X-ray diffraction.

Figure 3:
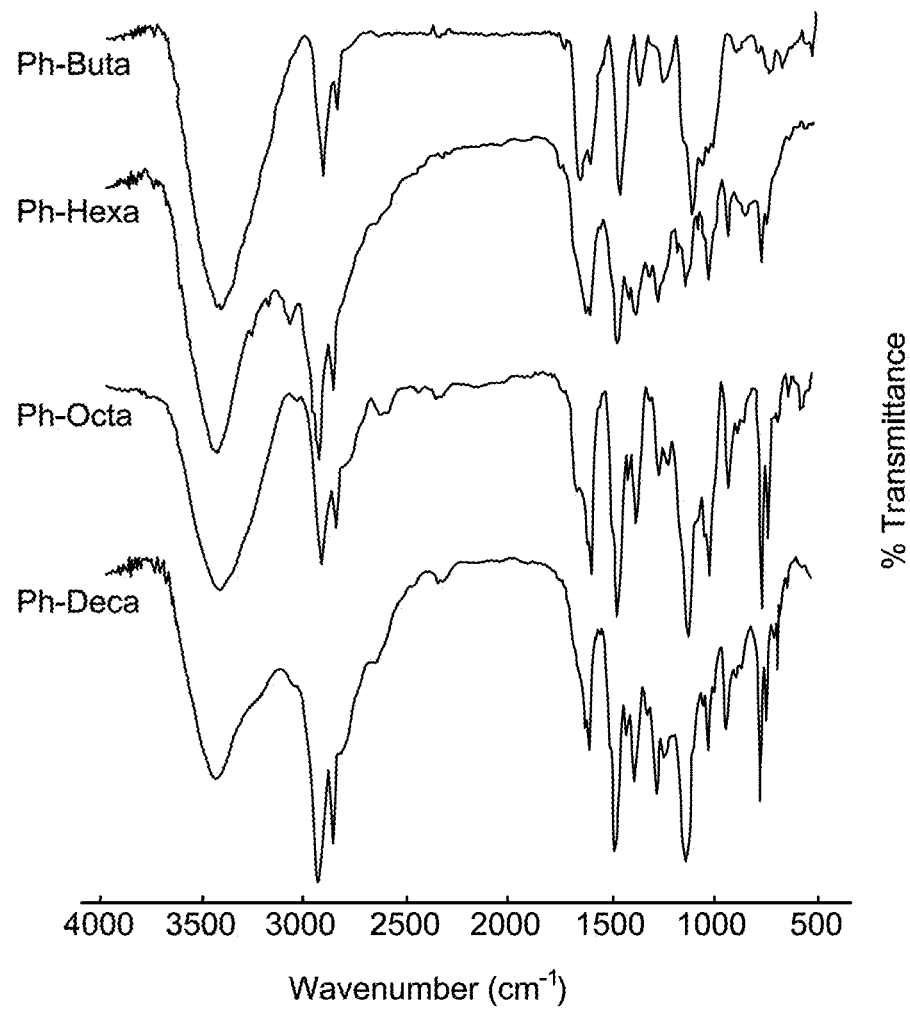
FIG. 3 shows FTIR spectra of cross-linked terpolymers synthesized according to the process of FIG. 1.

FTIR spectra for the synthesized terpolymers are presented in FIG. 3. The spectra of the four terpolymers (Ph-Buta, Ph-Hexa, Ph-Octa and Ph-Deca) are consistent with the proposed structure given in FIG. 1. The spectra shows a broad band at ~3425 $cm^{-1}$ which is assigned to the intermolecular hydrogen bonding and the stretching vibration of —OH and —NH groups, respectively [S. Cavus, G. Gutdag, Ind. Eng. Chem. Res. 48 (2009) 2652-2658—incorporated herein by reference in its entirety]. A sharp medium band at ~1613 $cm^{-1}$ is assigned to the Asymmetric —NH bending vibration. Two sharp strong bands at ~1595 and ~1466 $cm^{-1}$ are assigned to the C=C aromatic ring stretching vibration. The weak sharp band ~1220 is assigned to C—O stretching vibration. The strong sharp band at ~1115 $cm^{-1}$ is assigned to C—N stretching vibration. The band ~750 is assigned to the N—H wag vibration. The strong sharp band at ~720 $cm^{-1}$ is assigned to the $CH_2$ Rock which indicates a long chain of $CH_2$ which is consistent with the long aliphatic chains of the diaminoalkanes, sharp intense bands at 2925 $cm^{-1}$ and 2852 $cm^{-1}$ are assigned to C—H symmetrical and asymmetrical stretching vibrations, were the intensity of the bands increase with the increase of the aliphatic chain of the diaminoalkanes [R. S. Azarudeen, R. Subha, D. Jeyakumar, A. R. Burkanudeen, Sep. Purif. Technol. 116 (2013) 366-377; L. Bellamy, third ed. Infrared Spectra of complex molecules, chapman and Hall, London, (1975); B. H. Stuart, Infrared Spectroscopy: Fundamentals and Applications, John Wiley & Sons Ltd, Chichester, West Sussex (2004)—each incorporated herein by reference in its entirety].

Figure 4:
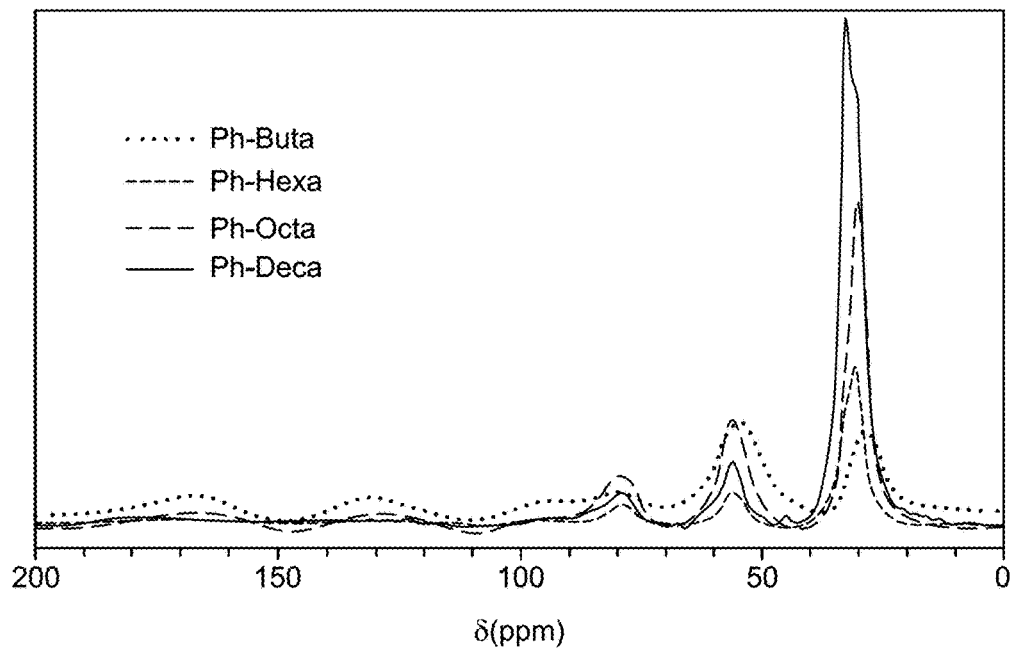
FIG. 4 shows $^{13}$C-NMR spectra of the synthesized cross-linked terpolymers.

Solid state $^{13}$C-NMR is considered a powerful technique for the characterization of cross-linked polymers as they are insoluble in any solvent [R. Rego, P. J. Adriaensens, R. A. Carleer, J. M. Gelan, Polymer 45(2004) 33-38; A. Georgakopoulos, J. Serb. Chem. Soc., 68 (2003) 599-605; I. S. Chuang, G. E. Maciel, Macromolecules 17 (1984) 1087-1090—each incorporated herein by reference in its entirety]. The $^{13}$C-NMR spectra are shown in FIG. 4, wherein similar peaks are found to represent the structure of the four synthesized cross-linked terpolymers and the assignment of peaks are tabulated in Table 2, but a difference in the intensity of aliphatic methylene chain (without the methylene units attached to the amino group) of the diaminoalkane; as the number of methylene units increase the intensity of the peak ~30 ppm increases. The $^{13}$C-NMR spectra confirm the structure of the proposed synthesized cross-linked terpolymers.

TABLE 2

<sup>13</sup>C NMR Data for the synthesized cross-linked terpolymers.

| Structure* | ~ δ (ppm) | | | | | |
|---|---|---|---|---|---|---|
| | 1 | 2 | 3 | 4 | 5 | 6 |
| [structure: OH-phenyl-CH₂-NH-CH₂- with positions 1,2,3,4,5,6] | 167 | 133 | 95 | 80 | 55 | 30 |

*The structure is part of the terpolymer, all unassigned carbons have similar peaks.

The elemental analysis data of the synthesized terpolymers in Table 1 was in good agreement with the proposed structure. As the chain length increases the structure is added with three $CH_2$ units increasing the % of carbon and decreasing the % of nitrogen in the polymer monomer unit.

Figure 5:
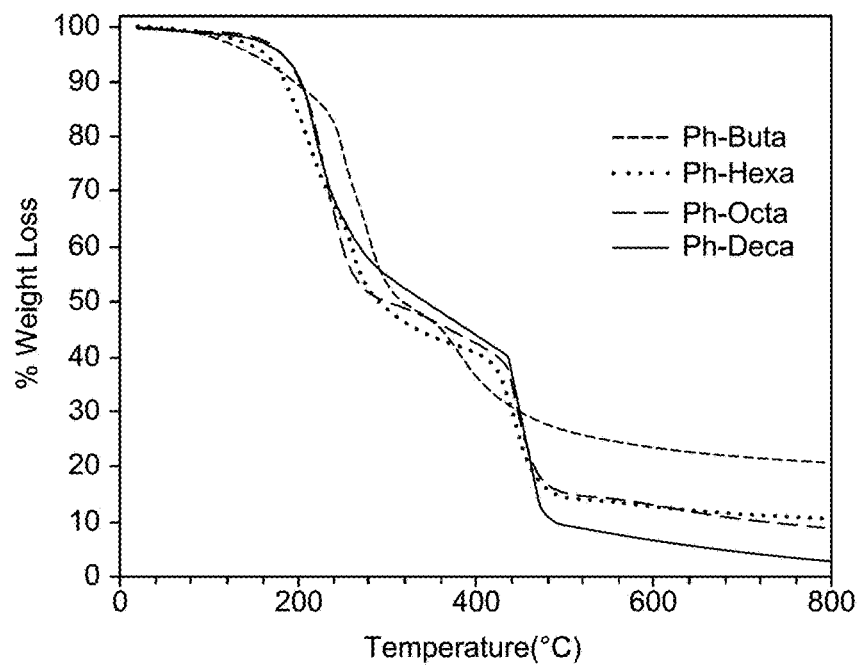
FIG. 5 shows TGA curves of the synthesized cross-linked terpolymers.

Thermogravimetric analysis (TGA) was carried out in order to evaluate the thermal stability of the synthesized terpolymers and the TGA curves are shown in FIG. 5. The Ph-Buta thermogram shows three major degradation patterns: initial ~16% at 72-236° C. due to the loss of water molecules strongly held within the terpolymer network by intermolecular hydrogen bonds which indicates the high hydrophilicity of Ph-Buta, then a sharp weight loss of ~38% at 236-353° C. due to the thermal degradation of the aliphatic chain of 1,4-diaminobutane, finally, a gradual weight loss of ~25% at 353-800° C. due to carbonization or pyrolysis of the aromatic moieties [I. Muylaert, A. Verberckmoes, J. De Decker, P. Van Der Voort, Adv. Colloid Interfac. 175 (2012) 39-51—incorporated herein by reference in its entirety]. The Ph-Hexa, Ph-Octa and Ph-Deca thermograms show similar trends of thermal degradation. Water loss in the thermograms is absent and this could be explained by the higher ratio of hydrophobic to hydrophilic character found in the longer aliphatic chains, which expels water molecules out the polymer matrix. The Ph-Hexa, Ph-Octa and Ph-Deca thermograms in FIG. 5, show two major degradation patterns. The first degradations include a weight loss of ~50% at 141-296° C. for Ph-Hexa, ~50% at 160-279° C. for Ph-Octa and ~60% at 164-430° C. for Ph-Deca due to the loss of the aliphatic chains of diaminoalkane. The higher thermal stability possessed by Ph-Deca, may be due the higher van der Waals interaction that increases with increasing the chain length [A. R. Hirst, D. K. Smith, M. C. Feiters, H. P. M. Geurts, Langmuir 20 (2004) 7070-7077—incorporated herein by reference in its entirety]. The second degradations include ~41% weight loss at 296-800° C. for Ph-hexa, ~42% at 279-800° C. for Ph-Octa and ~37% at 430-800° C. for Ph-Deca, all of which could be due to carbonization and pyrolysis [I. Muylaert, A. Verberckmoes, J. De Decker, P. Van Der Voort, Adv. Colloid Interfac. 175 (2012) 39-51—incorporated herein by reference in its entirety].

Figure 6:
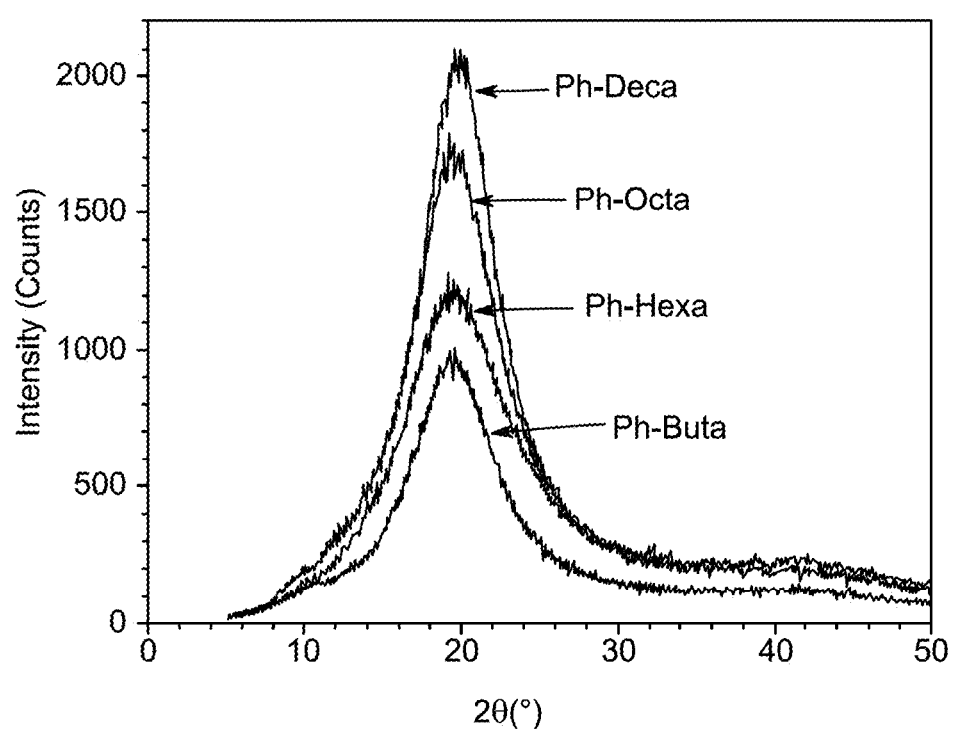
FIG. 6 illustrates powder X-ray diffraction patterns for the synthesized cross-linked terpolymers.

Powder X-ray diffraction (XRD) patterns shown in FIG. 6 reveal the presence of a peak at 2θ~20°; an increase of the chain length of the diaminoalkane present in the terpolymer showed enhanced crystallinity of the synthesized terpolymers. Upon calculating the degree of crystallinity (Table 3) the highest degree of crystallinity was for Ph-Deca (83.1%). A possible explanation for this observation was that the formation of the terpolymers happened within a short time of the reaction process, then the terpolymers were left to cure at 90° C. for 24 h allowing the terpolymer chains to reorder and longer chains with higher flexibility showed enhanced crystallinity [J. Blackwell, M. R. Nagarajan, T. B. Hoitink, Polymer 23 (1982) 950-956—incorporated herein by reference in its entirety].

TABLE 3

Degree of crystallinity of the synthesized cross-linked terpolymers upon the XRD diagram shown in FIG. 6.

| Cross-linked terpolymer | Degree of crystallinity (%)* |
|---|---|
| Ph-Buta | 79.7 |
| Ph-Hexa | 81.4 |
| Ph-Octa | 82.7 |
| Ph-Deca | 83.1 |

*Degree of crystallinity = (Area under crystalline peak(2θ~20)/total area under the curve) × 100%.

Example 4

Adsorption Experiments

Adsorption experiments of the synthesized cross-linked terpolymers for $Pb^{2+}$ ions were performed in a similar fashion as previously reported [S. A. Ali, O. C. S. Al-Hamouz, N. M. Hassan, J. Hazard. Mater. 248-249 (2013) 47-58—incorporated herein by reference in its entirety]. Accordingly, 0.03 g of terpolymer, powder or pellet form, was mixed with 20 ml of a $Pb(NO_3)_2$ solution of a desired pH and stirred for 24 h. The $Pb(NO_3)_2$-terpolymer mixture was filtered and washed with deionized water. The amount of $Pb^{2+}$ ions in the filtrate was analyzed by Atomic absorption spectroscopy (AAS). The adsorption capacity ($q_e$) in mg $g^{-1}$ can be found by the following Equation 1:

$$q_e = \frac{(C_o - C_f)V}{W} \quad \text{(Equation 1)}$$

where $C_o$ and $C_f$ are initial and final concentration of $Pb^{2+}$ ions in mg $L^{-1}$, respectively, W is the weight of the dried terpolymer in g, and V is the volume of solution in L. The results obtained represent the average of three runs and varied by less than 5%. The adsorption isotherms were carried out by changing the concentration of $Pb^{2+}$ ions from 50-135 mg $L^{-1}$ at pH 5 for 4 h at 25° C. For adsorption kinetics, Ph-Buta was immersed in 20 ml of 136 mg $L^{-1}$ solution of $Pb^{2+}$ ions for different durations at pH 5.

Figure 7:
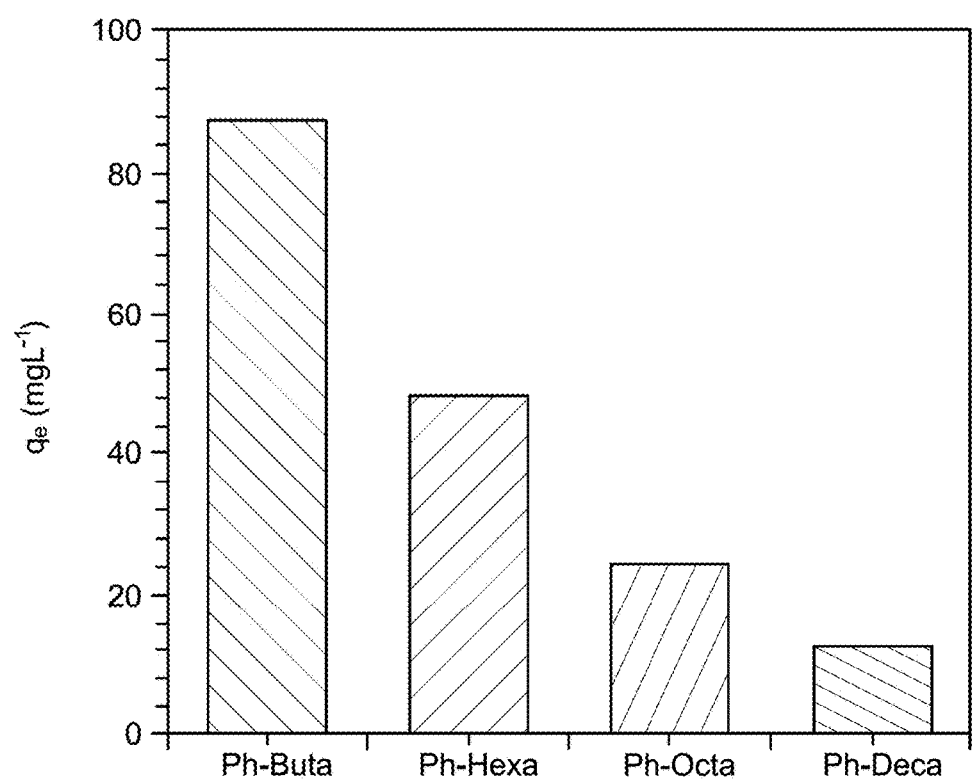
FIG. 7 illustrates the effect of an aliphatic chain length chain on the adsorption of $Pb^{2+}$ ions by the synthesized cross-linked terpolymers at pH 5 for 24 h at 25° C.

Two main functionalities are responsible for the adsorption of $Pb^{2+}$ ions in the synthesized cross-linked terpolymers; the hydroxyl group (—OH) and the secondary amine group (—NH—). The presence of two lone pairs on the oxygen atom and one lone pair on the nitrogen atom with high electronegativity (oxygen=3.5 and nitrogen=3.0) provide high electrostatic attraction between the positive $Pb^{2+}$ ions and the synthesized cross-linked terpolymers. Another factor is the length of the diaminoalkane chain; where 25 mg of each cross-linked terpolymer was immersed in 20 ml of 136 mg $L^{-1}$ solution of $Pb^{2+}$ ions and stirred for 24 h, filtered and the concentration of the solution was measured before and after adsorption. As seen in FIG. 7, as the chain length of the diaminoalkane increases the adsorption capacity decreases which could be attributed repulsion between the long hydrophobic entangled methylene chains (—$(CH_2)_n$—) with $Pb^{2+}$ hydrophilic hydration shell.

Example 5

Effect of pH on Adsorption Capacity of Terpolymers

The effect of pH is an important factor in the adsorption of heavy metals as $H^+$ is competing for the adsorption sites in the synthesized cross-linked terpolymers. The second factor is metal speciation where, upon reaching a pH of 6 and above lead ions precipitate forming lead hydroxide precipitates [A. A. Mengistie, T. S. Rao, A. V. Rao, M. Singanan, Bull. Chem. Soc. Ethiop. 22 (2008) 349-360; P. X. Sheng, Y. P. Ting, J. P. Chen, L. Hong, J. Colloid Interface Sci. 275(2004) 131-141; H. B. Bradl, J. Colloid Interface Sci. 277 (2004) 1-18; M. Machida, R. Yamazaki, M. Aikawa, H. Tatsumoto, Sep. Purif. Technol. 46 (2005) 88-94—each incorporated herein by reference in its entirety].

Figure 8:
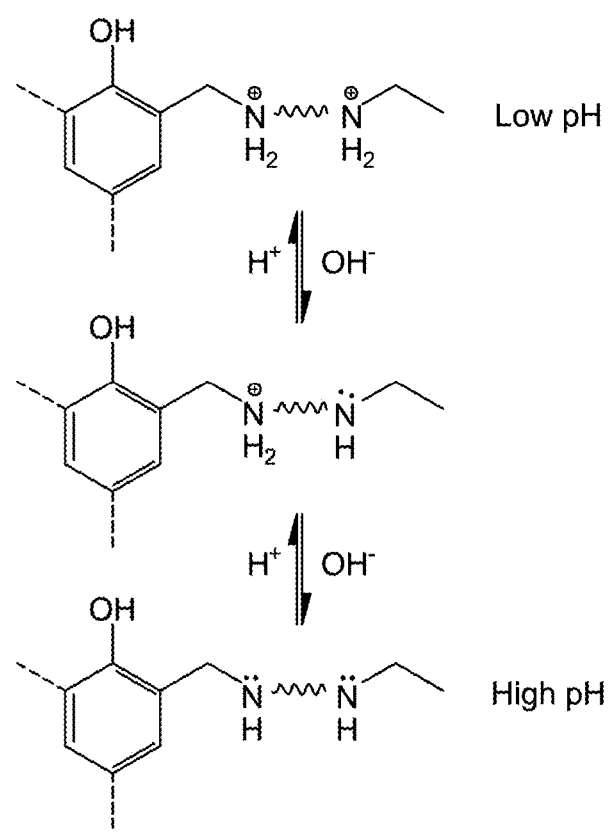
FIG. 8 illustrates the effect of pH on structure of the synthesized cross-linked terpolymers.
Figure 9:
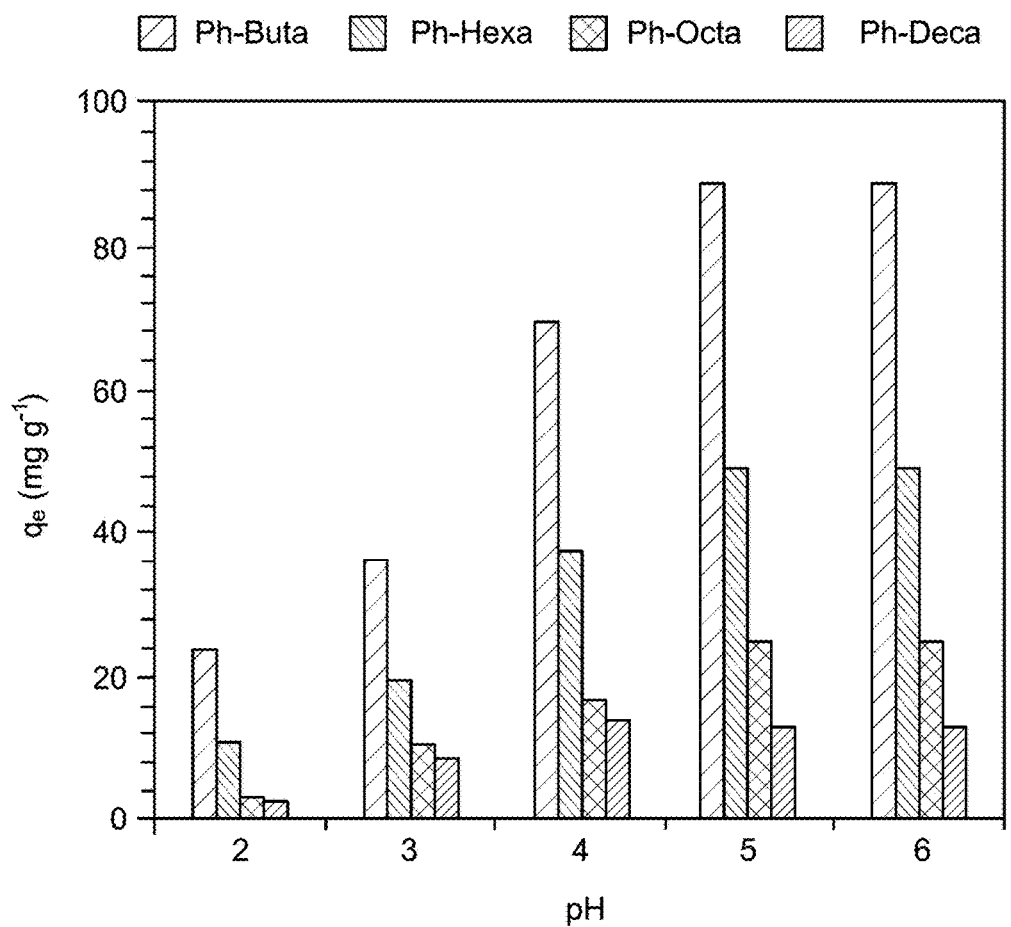
FIG. 9 illustrates the effect of pH on the adsorption capacity of the synthesized cross-linked terpolymers.

As can be seen in FIG. 8, at low pH values, the positive ammonium ion (—$^+NH_2$—) predominates leading to electrostatic repulsion with positive $Pb^{2+}$ ions. No effect on the hydroxyl (—OH) group within the pH range of 2-6 as deprotonation will not occur until pH~8 [D. D. O. Vaz, A. N. Fernandes, B. Szpoganicz, M. M. Sierra, Eclet. Quím. 35 (2010) 147-152—incorporated herein by reference in its entirety]. On the contrary, a higher pH decreases the amount of positive $H^+$ and increases the negative charge on the surface of the cross-linked terpolymer leading to higher electrostatic attraction with $Pb^{2+}$ ions. The effect of pH on the adsorption capacity is shown in FIG. 9. As the pH increases the adsorption capacity increases.

FIG. 7A and Table 4 show that the adsorption data fits well with the Langmuir model. The linear form of the Langmuir model can be expressed by the following Equation 2 [R. S. Azarudeen, R. Subha, D. Jeyakumar, A. R. Burkanudeen, Sep. Purif. Technol. 116 (2013) 366-377; Y. Zhu, J. Hu, J. Wang, J. Hazard. Mater. 221-222 (2012) 155-61; P. Kampalanonwat, P. Supaphol, ACS Appl. Mater. Interfaces. 2 (2010) 3619-27—each incorporated herein by reference in its entirety]:

$$\frac{C_e}{q_e} = \frac{C_e}{Q_m} + \frac{1}{Q_m b} \quad \text{(Equation 2)}$$

where $q_e$ and $C_e$ are the adsorption capacity at equilibrium (mg g$^{-1}$) and concentration of metal ions at equilibrium (mg L$^{-1}$), respectively, $Q_m$ is the maximum adsorption capacity of metal ions on the adsorbent (mg g$^{-1}$) and b is the Langmuir constant related to the adsorption energy (L mg$^{-1}$). The values of $Q_m$ and b are found in Table 4. As can be seen from Table 4 and FIGS. 11A-11D, $Q_m$ values decrease as the methylene chain length of the diaminoalkane increase, indicating higher accessibility to adsorption sites in Ph-Buta compared to Ph-Deca. A higher amount of aliphatic hydrophobic chains leads to lower adsorption capacity as a higher amount of hydrophobic moiety masks the adsorption sites from hydrophilic hydration shell of $Pb^{2+}$ ions. A smaller length of aliphatic chains increases the concentration of the adsorption sites by exposing the adsorption sites to $Pb^{2+}$ ions which increases the adsorption capacity.

TABLE 4

Langmuir, Freundlich and Temkin isotherm model constants for $Pb^{2+}$ ion adsorption.

| Cross-linked terpolymer | Langmuir isotherm model | | | Freundlich isotherm model | | | Temkin isotherm model | | |
|---|---|---|---|---|---|---|---|---|---|
| | $Q_m$ (mg g$^{-1}$) | b (L mg$^{-1}$) | $R^2$ | $k_f$ (mg$^{1-1/n}$ g$^{-1}$ L$^{1/n}$) | n | $R^2$ | A (L g$^{-1}$) | B (J mol$^{-1}$) | $R^2$ |
| Ph-Buta | 222.2 | 0.0044 | 0.9728 | 0.800 | 1 | 1 | 0.0362 | 62.40 | 0.9891 |
| Ph-Hexa | 33.33 | 0.0311 | 0.9668 | 0.800 | 1 | 1 | 0.0597 | 37.26 | 0.9939 |
| Ph-Octa | 10.40 | 0.0406 | 0.9604 | 0.800 | 1 | 1 | 0.1211 | 18.47 | 0.9931 |
| Ph-Deca | 1.425 | −3.003 | 0.9442 | 0.800 | 1 | 1 | 0.2137 | 10.31 | 0.9950 |

Example 6

Figure 10A:
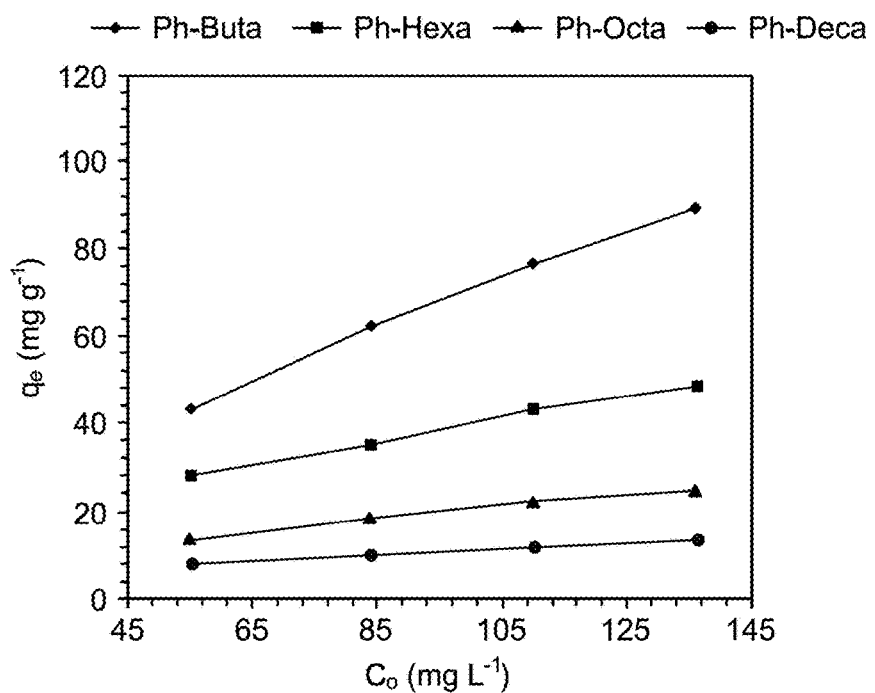
FIG. 10A illustrates the effect of $Pb^{2+}$ ion solution concentration on the adsorption capacity of the synthesized cross-linked terpolymers.
Figure 10B:
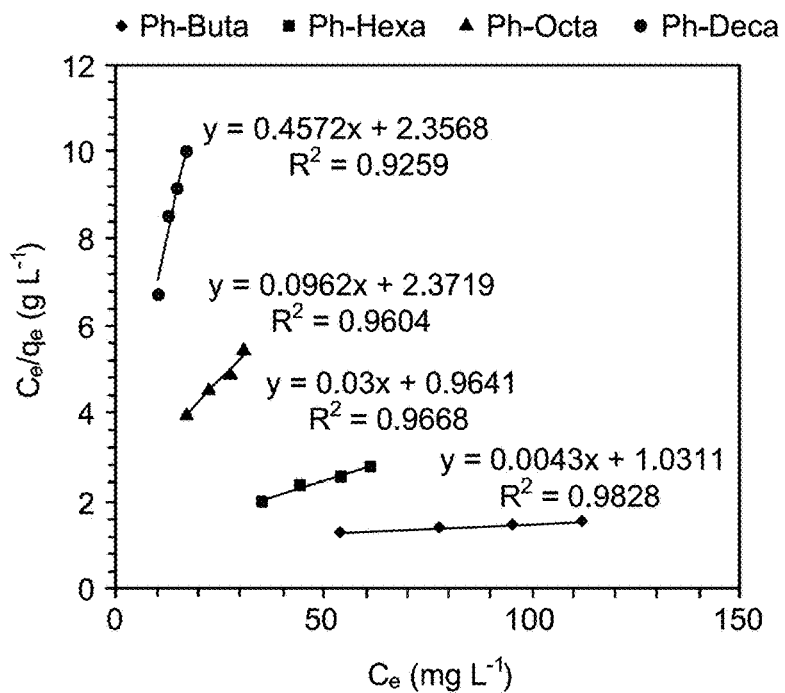
FIG. 10B shows Langmuir isotherm model plots for $Pb^{2+}$ ion adsorption capacity of the synthesized cross-linked terpolymers.

Effect of Initial Concentration on $Pb^{2+}$ Adsorption Capacity of Terpolymers The effect of initial concentration was studied at pH=5 on solutions of $Pb^{2+}$ ions with an initial concentration $C_o$ ranging between 55 and 136 mg L$^{-1}$. The effect of initial concentration on the adsorption capacities of the synthesized cross-linked terpolymers are shown in FIG. 10A. FIG. 10A shows that the adsorption capacity increases with an increase of initial concentration. To further explore the adsorption mechanism, three isotherm models were employed; Langmuir, Freundlich and Temkin isotherm models in order to investigate the adsorption data which is shown in Table 4.

The Langmuir model is utilized to describe the adsorption of an adsorbate on a homogeneous surface of an adsorbent, where each adsorption site can be occupied by one metal ion and there is no interaction between the adsorbed metal ions.

A dimensionless factor or equilibrium parameter ($R_L$) which can be utilized to show the favorability of adsorption on the terpolymer surface by Equation 3:

$$R_L = \frac{1}{(1 + bC_o)} \quad \text{(Equation 3)}$$

where $C_o$ is the initial metal concentration of $Pb^{2+}$ ions (mg L$^{-1}$) and b is the Langmuir constant. If the value of $R_L$ falls in the region of $0 < R_L < 1$; the adsorption is favorable, if $R_L = 0$ then the adsorption is irreversible. As shown in Table 5, all the values are found between $0 < R_L < 1$ which indicate favorable adsorption occurring on the synthesized cross-linked terpolymers, except, Ph-Deca. The values of $R_L \approx 0$, which indicates irreversible adsorption, could be explained by the entrapment of adsorbed $Pb^{2+}$ ions inside the cross-linked terpolymers by long entangled chains. The $R_L$ values decreased by increasing the initial concentration of $Pb^{2+}$ ions which indicates that the adsorption process is more favorable at higher concentration of $Pb^{2+}$ ions (Table 5) [A. F. Shaaban, D. A. Fadel, A. A. Mahmoud, M. A. Elkomy, S. M. Elbahy, J. Environ. Chem. Eng. 2 (2014) 632-641—incorporated herein by reference in its entirety]. High % removal was observed as shown in Table 6, where a ~98% removal was achieved by Ph-Buta at an initial concentration of 55 mg $L^{-1}$. The high % removal indicates the potential use of the synthesized cross-linked terpolymers in the removal of toxic metal ions from wastewater.

The Temkin isotherm model postulates that the adsorption energy decreases linearly with the increase in surface coverage with metal ions due to adsorbent-adsorbate interactions, and the adsorption process is described by the uniform distribution of binding energies up to a maximum [A. F. Shaaban, D. A. Fadel, A. A. Mahmoud, M. A. Elkomy, S. M. Elbahy, J. Environ. Chem. Eng. 2 (2014) 632-641; 42]. The linear form of the Temkin isotherm model can be described as:

TABLE 5

The $R_L$ values based on the Langmuir isotherm model.

| $C_o$ (mg $L^{-1}$) | Ph-Buta $R_L$ | % Removal | Ph-Hexa $R_L$ | % Removal | Ph-Octa $R_L$ | % Removal | Ph-Deca $R_L$ | % Removal |
|---|---|---|---|---|---|---|---|---|
| 55 | 0.8052 | 98.18 | 0.3689 | 63.63 | 0.3096 | 30.87 | −0.006 | 18.68 |
| 84 | 0.7301 | 92.94 | 0.2768 | 52.54 | 0.2269 | 27.38 | −0.004 | 14.66 |
| 110 | 0.6736 | 86.94 | 0.2261 | 49.04 | 0.1831 | 25.45 | −0.003 | 12.54 |
| 136 | 0.6256 | 81.62 | 0.1912 | 44.85 | 0.1534 | 22.79 | −0.003 | 11.76 |

TABLE 6

First-order, second-order and Intraparticle diffusion kinetic models constants.

| Temperature (K) | Pseudo first-order $q_{e, exp}$ (mg $g^{-1}$) | $q_{e, cal}$ (mg $g^{-1}$) | $k_1$ ($h^{-1}$) | $R^2$ | Pseudo second-order $q_{e, cal}$ (mg $g^{-1}$) | $k_2$ (g $mg^{-1}h^{-1}$) | $h^a$ (mg $g^{-1}h^{-1}$) | $R^2$ | Intraparticle diffusion model $k_i$ (mg $g^{-1}h^{0.5}$) | C | $R^2$ |
|---|---|---|---|---|---|---|---|---|---|---|---|
| 298 | 92 | 42 | 0.6743 | 0.9723 | 94 | 0.0590 | 525.0 | 0.9984 | 51.74 | 30.79 | 0.9952 |
| 308 | 96 | 44 | 0.8231 | 0.9150 | 97 | 0.0624 | 588.2 | 0.9980 | 71.81 | 20.96 | 0.9808 |
| 323 | 98 | 42 | 0.7713 | 0.9385 | 100 | 0.0625 | 625.0 | 0.9988 | 77.81 | 20.56 | 0.9779 |

$^a h = k_2 q_e^2$ (initial rate of adsorption)

Figure 10C:
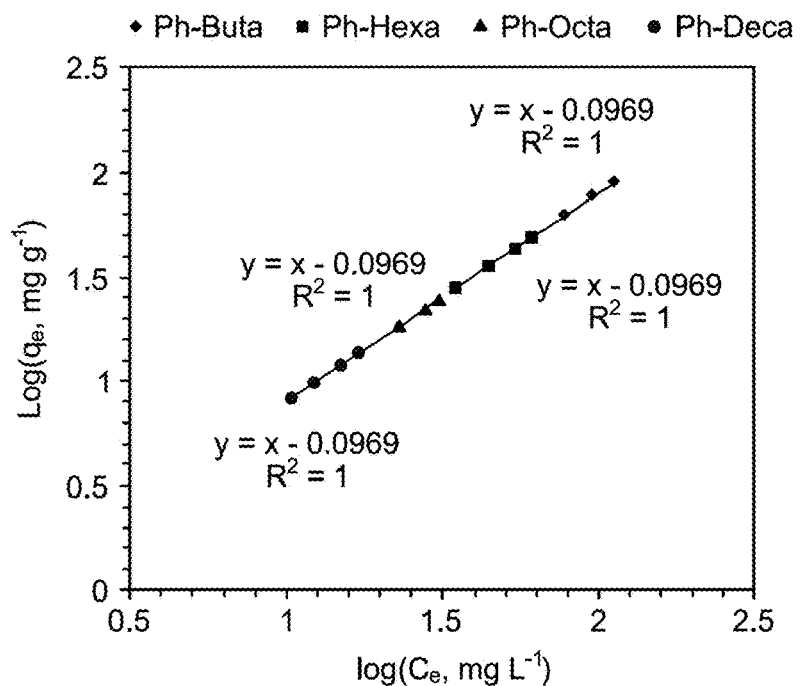
FIG. 10C is a Freundlich isotherm model plot for $Pb^{2+}$ ion adsorption capacity of the synthesized cross-linked terpolymers.
Figure 10D:
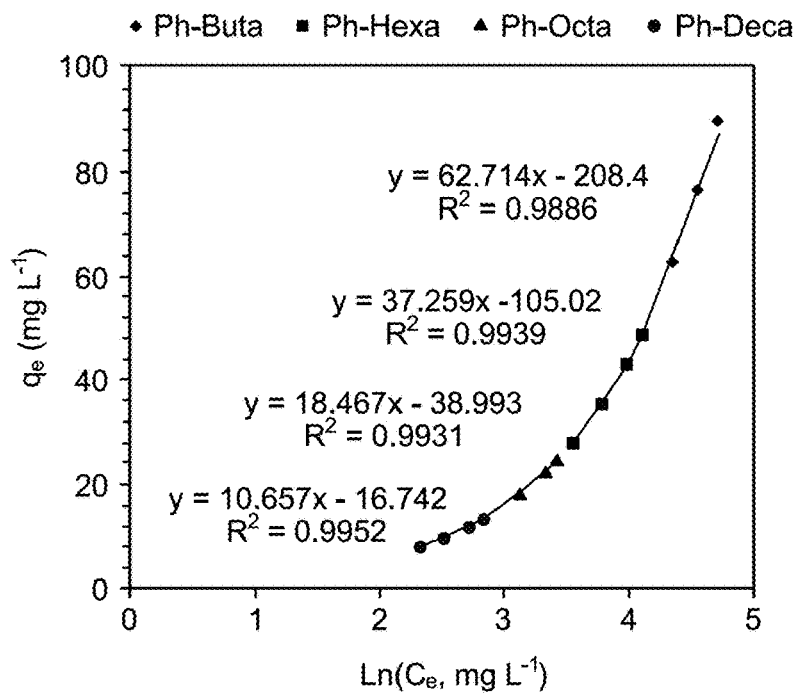
FIG. 10D is a Temkin isotherm model plot for $Pb^{2+}$ ion adsorption capacity of the synthesized cross-linked terpolymers.

The Freundlich model is utilized to describe the adsorption of an adsorbate on a heterogeneous surface with uniform energy of an adsorbent. The linear form of the freundlich model can be expressed by the following Equation 4 [S. Khalili, A. A. Ghoreyshi, M. Jahanshahi, K. Pirzadeh, CLEAN—Soil Air Water 41 (2013) 939-948; T. Tay, M. Candan, M. Erdem, Y. Ciimen, H. Turk, Clean—Soil Air Water 37 (2009) 249-255; C. L. Hsueh, Y. W. Lu, C. C. Hung, Y. H. Huang, C. Y. Chen, Dyes Pigm. 75 (2007) 130-135—each incorporated herein by reference in its entirety]:

$$\log q_e = \log k_F + \frac{1}{n} \log C_e \quad \text{(Equation 4)}$$

where $k_f$ and $1/n$ are constants related to adsorption capacity and intensity of adsorption[H. K. Boparai, M. Joseph, D. M. O'Carroll, J. Hazard. Mater. 186 (2011) 458-465—incorporated herein by reference in its entirety]. As shown in FIG. 10C, the data fitted the model, as all the data for different terpolymers showed similar fitness to the model which could be due to similar functional groups found in the cross-linked terpolymers. The results showed that the adsorption process is considered to be heterogeneous in nature as the correlation coefficient ($R^2$) of the data is unity.

$$q_e = \frac{Rt}{b} \ln A + \frac{Rt}{b} \ln C_e \quad \text{(Equation 5)}$$

$$q_e = B \ln A + B \ln C_e \quad \text{(Equation 6)}$$

where R is gas constant (8.314 J $mol^{-1}K^{-1}$), t is temperature (K), A is the equilibrium binding constant (L $g^{-1}$) corresponding to the maximum binding energy, and constant B=Rt/b is related to the heat of adsorption (J $mol^{-1}$). A plot of $q_e$ versus $\ln C_e$ (FIG. 10D) is used to calculate the Temkin isotherm constants A and B. linear plots with correlation coefficients >0.99 (Table 4) supports that the adsorption process of $Pb^{2+}$ ions on the synthesized cross-linked terpolymers to be considered as a chemisorption process [H. K. Boparai, M. Joseph, D. M. O'Carroll, J. Hazard. Mater. 186 (2011) 458-465—incorporated herein by reference in its entirety].

Example 7

Effect of Time and Temperature on $Pb^{2+}$ Adsorption Capacity of Terpolymers

Figure 11A:
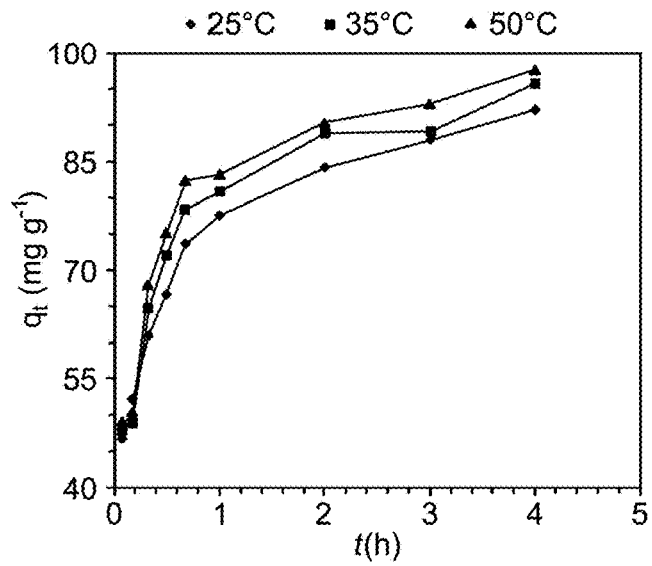
FIG. 11A illustrates the effect of time at 298, 308 and 323 K on the $Pb^{2+}$ ion adsorption capacity of Ph-Buta.

Time is an important factor for determining the adsorption mechanism by determining the rate-limiting step of the adsorption process. The time was restricted to no more than 4 h, where longer periods of time resulted in 100% removal of lead ions. Another factor is temperature were the thermodynamics of the adsorption process could be determined, three temperatures were studied at 298, 308 and 323 K at $C_o$=136 mg L$^{-1}$, an increase in the adsorption capacity as the temperature increased which could be explained by the increased swelling and expansion by the increase in temperature allowing more Pb$^{2+}$ ions to diffuse through and hence increase the adsorption capacity. Also, the increase in adsorption capacity with the increase in temperature suggests that the adsorption process is endothermic in nature (FIG. 11A). The mechanism of adsorption and thermodynamics will be determined for Ph-Buta as found to be the most efficient adsorbent in removing Pb$^{2+}$ ions for aqueous solution.

To evaluate the kinetics and mechanism of the adsorption process, the pseudo first-order, second-order and the intraparticle diffusion models were tested to explain the experimental data which is represented in Table 6. These models are important in order to design new adsorbents for the treatment of water and waste water resources [R. S. Azarudeen, R. Subha, D. Jeyakumar, A. R. Burkanudeen, Sep. Purif. Technol. 116 (2013) 366-377; R. Subha, C. Namasivayam, Can. J. Civil Eng. 36 (2009) 148-159—each incorporated herein by reference in its entirety].

Figure 11B:
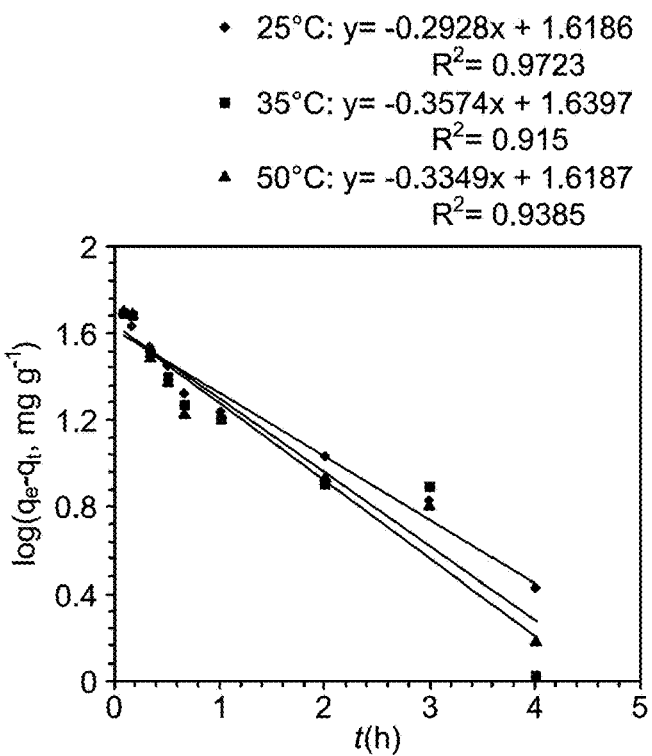
FIG. 11B is a pseudo first-order kinetic model plot of the $Pb^{2+}$ ion adsorption capacity of Ph-Buta.

Pseudo first-order kinetic model of the lageregren model describes the adsorption in solid-liquid systems and assumes that one metal ion is adsorbed on one site on the adsorbent surface. The linear form of the model can be represented by the following Equation 7 [Z.-Y. He, H.-L. Nie, C. Branford-White, L.-M. Zhu, Y.-T. Zhou, Y. Zheng, Bioresour. Technol. 99 (2008) 7954-7958—incorporated herein by reference in its entirety]:

$$\log(q_e - q_t) = \log q_e - \frac{k_1}{2.303}t \quad \text{(Equation 7)}$$

where $q_e$ and $q_t$ are the adsorption capacity at equilibrium and at time t (mg g$^{-1}$), respectively. $k_1$ is the first-order rate constant of adsorption (h$^{-1}$). The values of $k_1$ and $q_e$ can be calculated from the slope and intercept of the plot in FIG. 11B (Table 6). the correlation coefficient of the plots in FIG. 11B are relatively good however the values of $q_e$ are not in agreement with the experimental values represented in Table 6, Which suggests that the adsorption of Pb$^{2+}$ ions on Ph-Buta did not follow the pseudo first-order kinetic model.

Figure 11C:
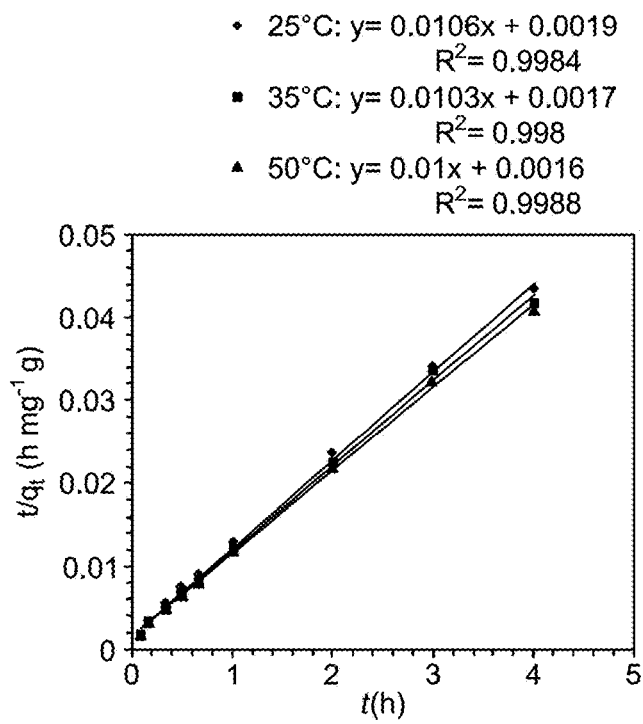
FIG. 11C is a pseudo second-order kinetic model plot of the $Pb^{2+}$ ion adsorption capacity of Ph-Buta.

Pseudo second-order kinetic model which is based on equilibrium adsorption and has been utilized for analyzing chemisorption kinetics from aqueous solutions can be linearly represented by the following Equation 8 [X. Ma, L. Li, L. Yang, C. Su, K. Wang, S. Yuan, J. Hazard. Mater. 209-210 (2012) 467-77—incorporated herein by reference in its entirety]:

$$\frac{t}{q_t} = \frac{1}{k_2 q_e^2} + \frac{1}{q_e}t \quad \text{(Equation 8)}$$

where $k_2$ and $q_e$ are the pseudo second-order rate constant (g mg$^{-1}$ h$^{-1}$) and the adsorption capacity at equilibrium, respectively, which are calculated from the slope and intercept of the plot in FIG. 11C. The values of $q_e$ and $k_2$ are presented in Table 6, and the correlation coefficients show that the adsorption process follows the kinetic model with adsorption capacities that agree with the experimental data. Another factor that should be noticed is the rate constant which increases as the temperature increase, suggesting that the adsorption process is endothermic. The fitness of the data with the kinetic model suggests that the adsorption process is chemisorption. Also the low surface area of Ph-Buta=0.0219 m$^2$ g$^{-1}$ also agrees with the second-order kinetic model that the adsorption process is chemisorption.

The intraparticle diffusion model which is used to investigate the mechanism of adsorption for a solid-liquid adsorption process can be described by three steps [H. K. Boparai, M. Joseph, D. M. O'Carroll, J. Hazard. Mater. 186 (2011) 458-465; E. I. Unuabonah, K. O. Adebowale, B. I. Olu-Owaolabi, J. Hazard. Mater. 144 (2007) 386-395—each incorporated herein by reference in its entirety]:

i. Transfer of metal ions from the bulk solution through liquid film to the adsorbent external surface (film diffusion).
ii. Intraparticle diffusion, where the metal ions diffuse through the external surface into the pores of the adsorbent.
iii. Adsorption on the interior surface of the adsorbent.

The final step is considered rapid and is negligible as the adsorption process comes to equilibrium. To identify the mechanism controlling the adsorption mechanism, Weber and Morris intraparticle diffusion model was used in order to determine whether the rate-limiting step is controlled by film diffusion or intraparticle diffusion and can be described using the following Equation 9:

$$q_t = k_i t^{0.5} + C \quad \text{(Equation 9)}$$

where $q_t$ is the adsorption capacity at time t, $K_i$ is the rate constant of intraparticle diffusion, C is related to boundary layer thickness. In order for the adsorption process to be totally controlled by the intraparticle diffusion model, a plot of $q_t$ versus $t^{0.5}$ has to fit the model and pass through the origin. But it has been reported that the plot of $q_t$ versus $t^{0.5}$ is multilinear and the adsorption process proceeds via multiple steps [H. K. Boparai, M. Joseph, D. M. O'Carroll, J. Hazard. Mater. 186 (2011) 458-465; E. I. Unuabonah, K. O. Adebowale, B. I. Olu-Owaolabi, J. Hazard. Mater. 144 (2007) 386-395—each incorporated herein by reference in its entirety].

Figure 11D:
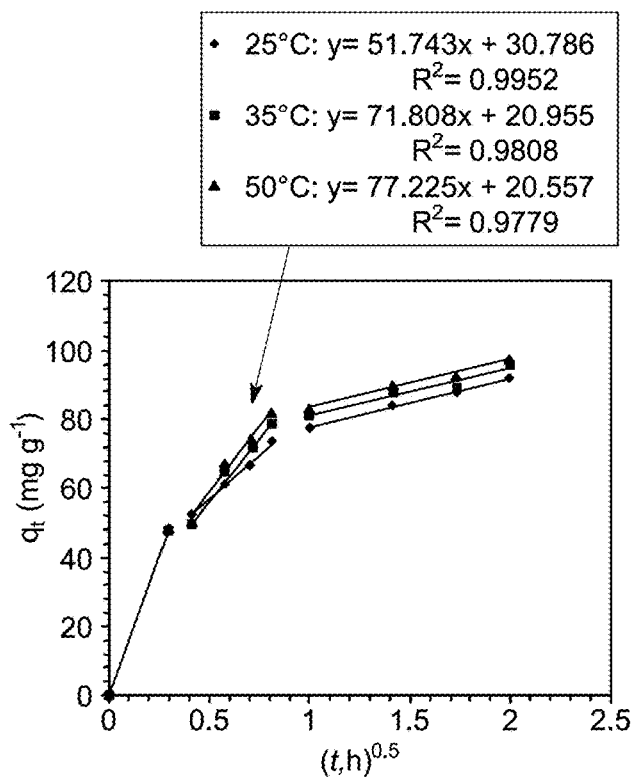
FIG. 11D is an intraparticle diffusion model plot of the $Pb^{2+}$ ion adsorption capacity of Ph-Buta.
Figure 12A:
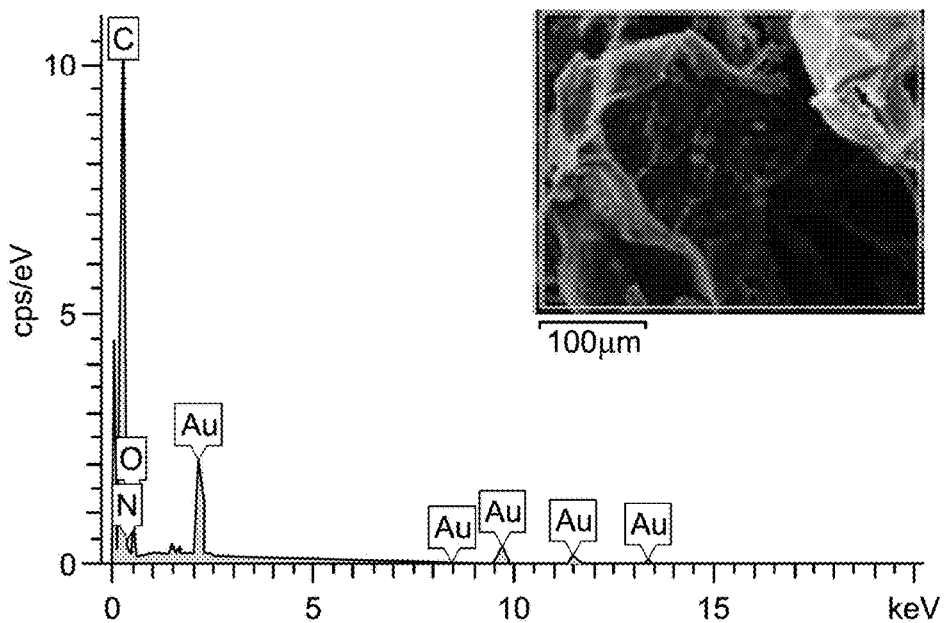
FIG. 12A is a SEM-EDX image of unloaded Ph-Buta.
Figure 12B:
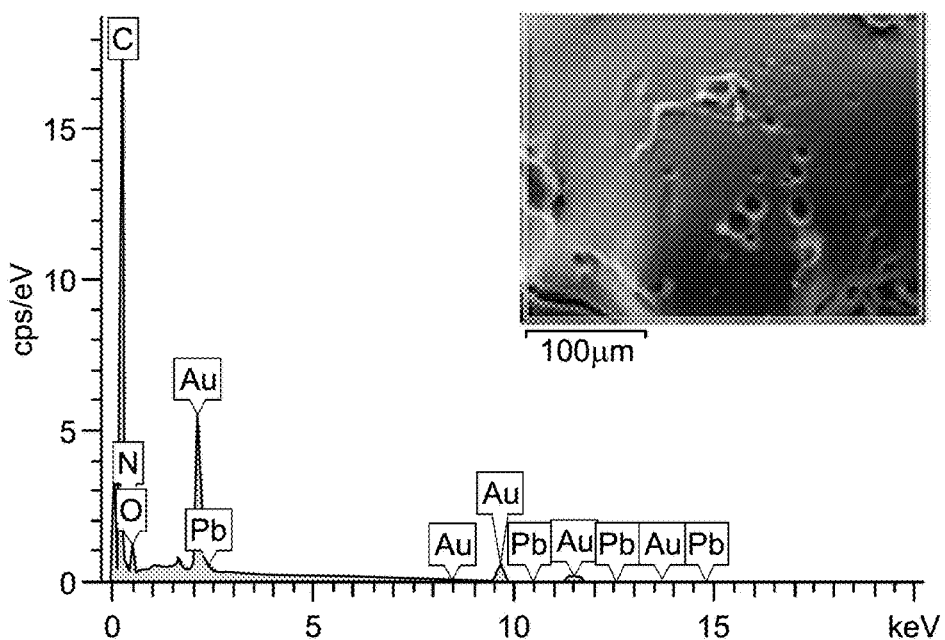
FIG. 12B is a SEM-EDX image of Ph-Buta loaded with $Pb^{2+}$ ions.
Figure 12C:
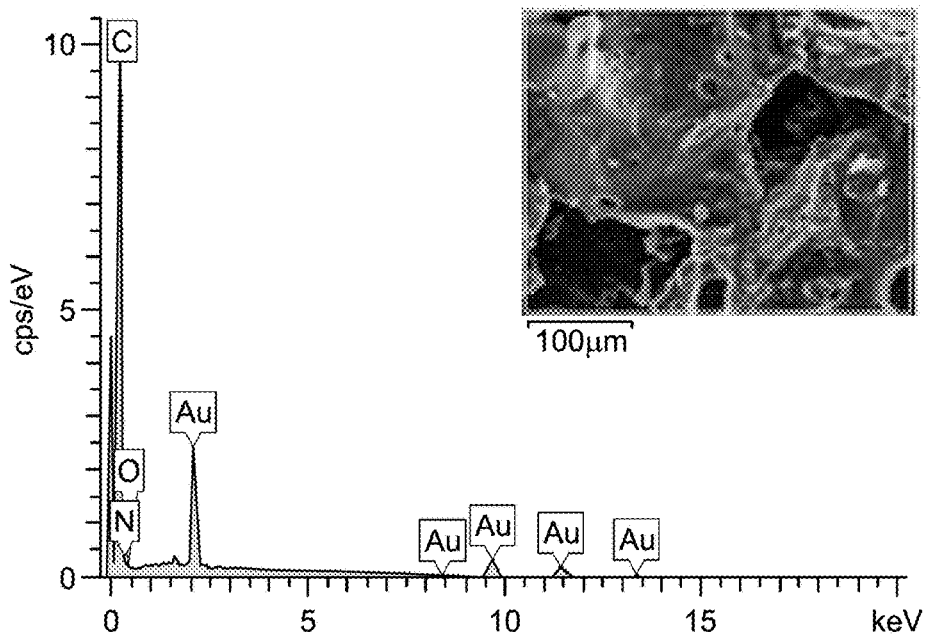
FIG. 12C is a SEM-EDX image of unloaded Ph-Hexa.
Figure 12D:
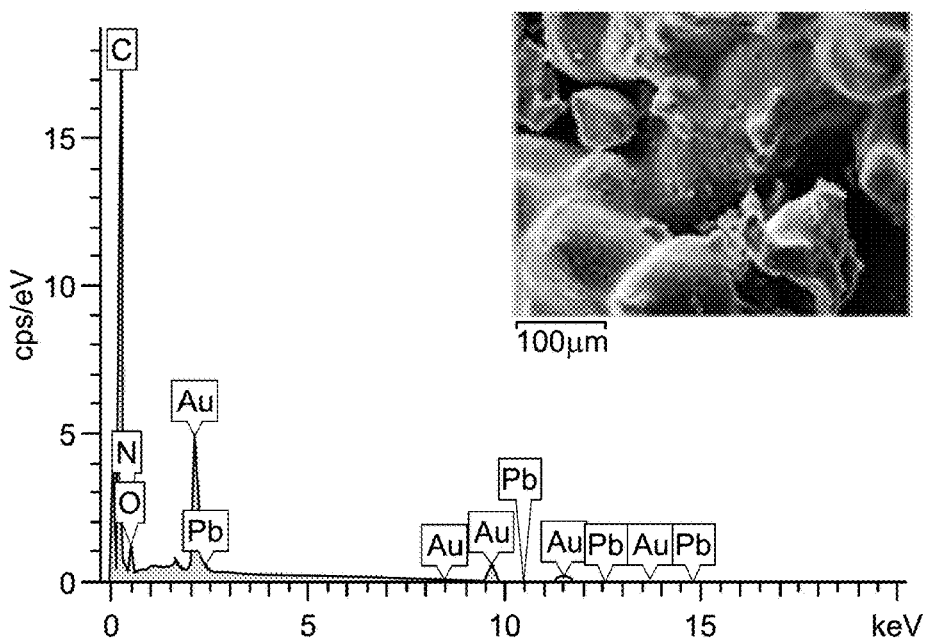
FIG. 12D is a SEM-EDX image of Ph-Buta loaded with $Pb^{2+}$ ions.
Figure 12E:
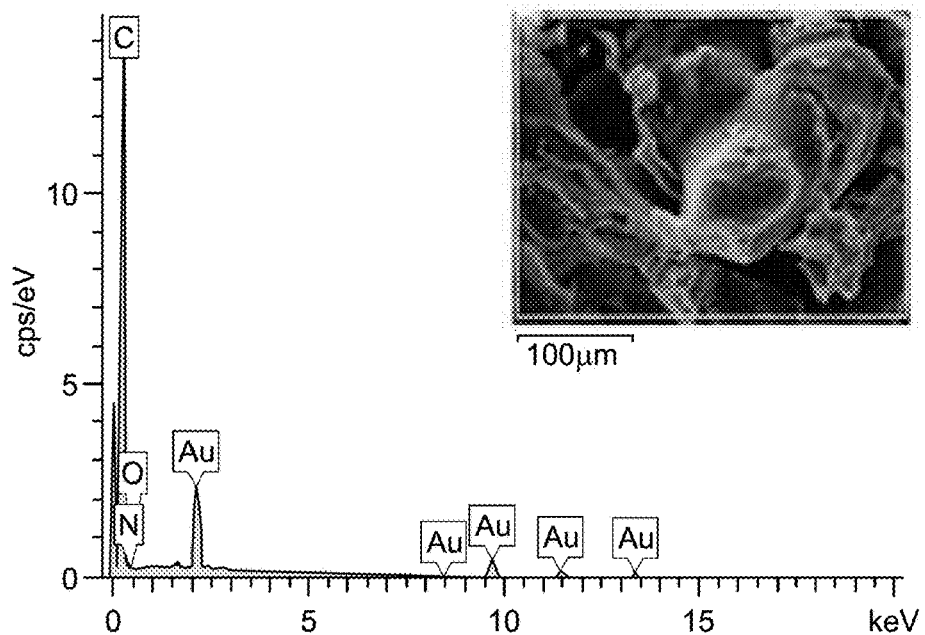
FIG. 12E is a SEM-EDX image of unloaded Ph-Octa.
Figure 12F:
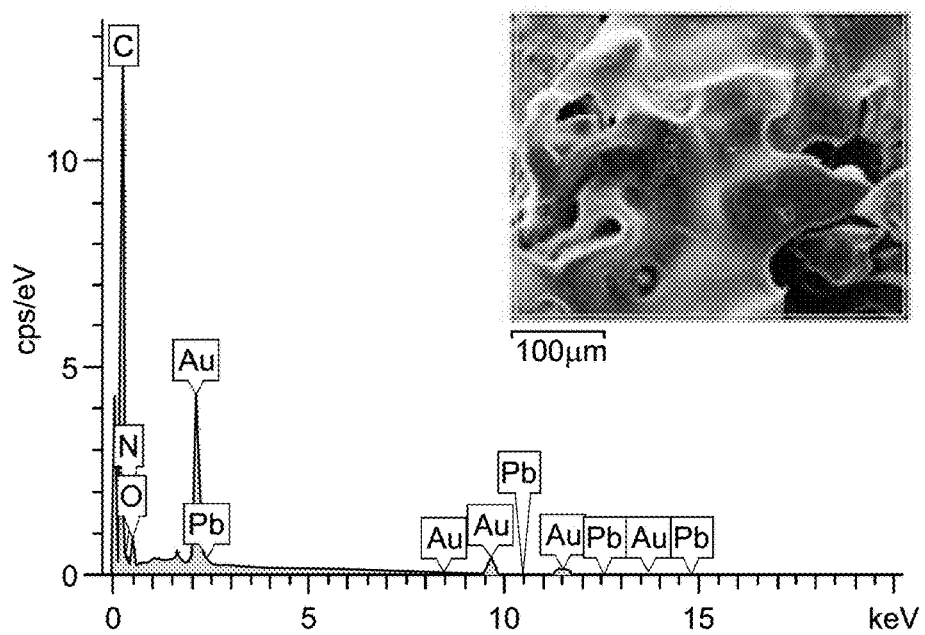
FIG. 12F is a SEM-EDX image of Ph-Octa loaded with $Pb^{2+}$ ions.
Figure 12G:
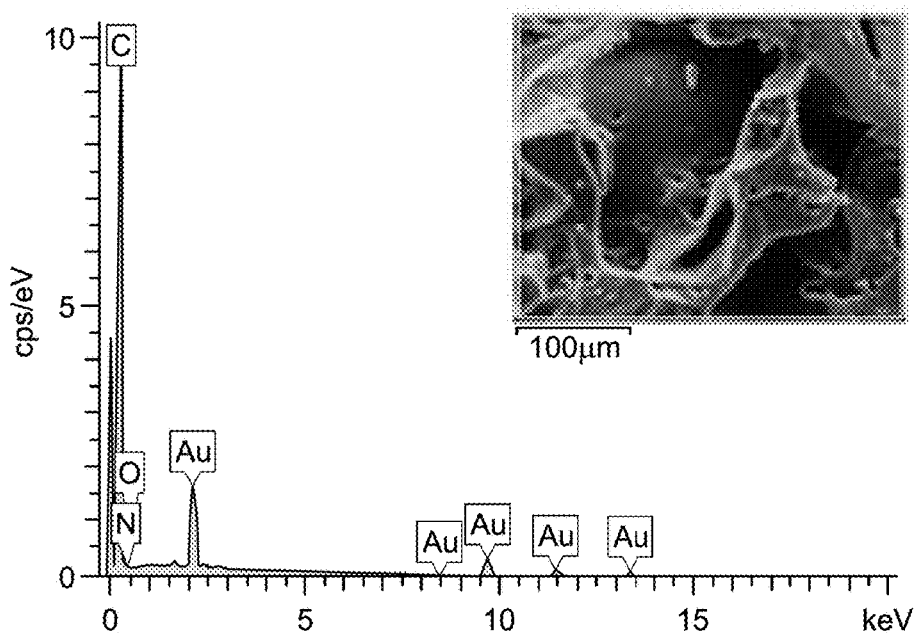
FIG. 12G is a SEM-EDX image of unloaded Ph-Deca.
Figure 12H:
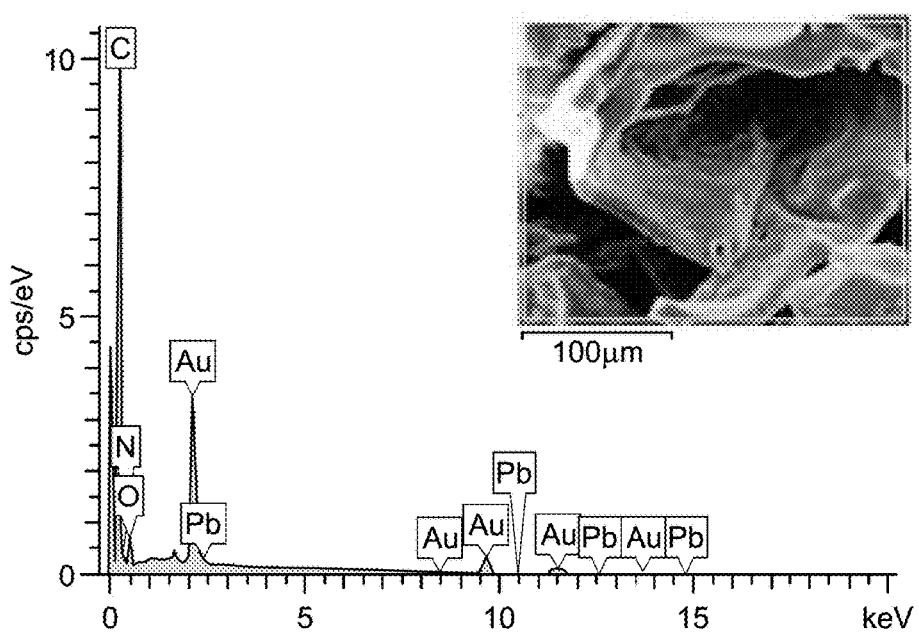
FIG. 12H is a SEM-EDX image of Ph-Deca loaded with $Pb^{2+}$ ions.

The adsorption process of Pb$^{2+}$ ions by Ph-Buta (FIG. 11D) showed three linear steps: first, rapid adsorption that represents film diffusion, the second linear step shows gradual increase in the adsorption capacity representing the rate-limiting step by intraparticle diffusion (Table 6), and finally, the third linear step which is achieving equilibrium. As shown in FIG. 11D, the plot did not pass through the origin indicating that intraparticle diffusion is not the only rate determining step. As shown in Table 6 the intercept values decreased as the temperature increased which could be attributed to the decrease in thickness of the boundary layer surrounding the adsorbent, suggesting that film diffusion becomes less effective in the rate determining step [E. I. Unuabonah, K. O. Adebowale, B. I. Olu-Owaolabi, J. Hazard. Mater. 144 (2007) 386-395; F. C. Wu, R. L. Tseng, R. S. Juang, Chem. Eng. J. 153 (2009) 1-8—each incorporated herein by reference in its entirety].

Example 8

SEM-EDX Images of Unloaded and Pb$^{2+}$-Loaded Terpolymers

Unloaded and Pb$^{2+}$-loaded terpolymers were analyzed by scanning electron microscopy. The terpolymers were first immersed in 125 mg L$^{-1}$ Pb$^{2+}$ ion solution for 24 h at room temperature, filtered and dried. Loaded and unloaded terpolymers were then coated with a thin film of gold. SEM- EDX images reveal that the adsorption of $Pb^{2+}$ ions has occurred on the surface and throughout the terpolymers as shown in FIGS. 12A-12H.

Example 9

Treatment of Wastewater Samples with Ph-Buta

In order to investigate the effectiveness of Ph-Buta, two wastewater samples were used. 0.03 g of Ph-Buta was immersed in 20 ml spiked and unspiked wastewater samples and left to stir for 24 hours. The polymer was filtered and washed with distilled water and the filtrate was analyzed. The metal concentration before and after adsorption was analyzed via ICP-MS. The results before and after adsorption with Ph-Buta are shown in Tables 7 and 8. The results show high efficacy in the removal of lead, cadmium, zinc and copper metal ions from wastewater samples. Ph-Buta showed 100% removal of lead (II) ions from the spiked wastewater sample indicating high potential as an efficient adsorbent for the removal of toxic metal ions from wastewater samples.

TABLE 7

Comparison of metals concentration in a spiked wastewater sample 1 obtained from a water treatment plant (Doha, Saudi Arabia).

| Metal | Original Sample (µg L$^{-1}$) | After Treatment with Ph-Buta (µg L$^{-1}$) |
|---|---|---|
| Co | 1.118 ± 0.291 | 0.47 ± 0.096 |
| Cu | 949.1 ± 49.14 | 200.8 ± 0.685 |
| Zn | 749.20 ± 58.5 | 46.25 ± 9.63 |
| As | 5.455 ± 0.447 | 4.815 ± 0.67 |
| Sr | 4677.0 ± 387.0 | 4258.0 ± 61.30 |
| Mo | 6.272 ± 0.318 | 11.6 ± 0.18 |
| Cd | 0.787 ± 0.285 | <MDL |
| Hg | 9.436 ± 0.386 | 1.075 ± 0.18 |
| Pb | <MDL | <MDL |

Mean and standard deviation of triplicates (n = 3). ± Values are the detection limit (MDL), 3σ of blank sample.

TABLE 8

Comparison of metals concentration in a spiked wastewater sample 2 obtained from a water treatment plant (Doha, Saudi Arabia).

| Metal | Original Sample (µg L$^{-1}$) | After Treatment with Ph-Buta (µg L$^{-1}$) |
|---|---|---|
| Co | 1.118 ± 0.291 | 0.548 ± 0.291 |
| Cu | 949.1 ± 49.14 | 153.2 ± 49.14 |
| Zn | 749.20 ± 58.5 | 67.82 ± 58.5 |
| As | 5.455 ± 0.447 | 4.607 ± 0.447 |
| Sr | 4677.0 ± 387.0 | 4288.0 ± 387.0 |
| Mo | 6.272 ± 0.318 | 7.01 ± 0.318 |
| Cd | 0.787 ± 0.285 | <MDL |
| Hg | 9.436 ± 0.386 | 1.32 ± 0.386 |
| Pb (spiked) | 1052.0 ± 12.01 | <MDL |

Mean and standard deviation of triplicates (n = 3). ± Values are the detection limit (MDL), 3σ of blank sample.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A method of removing $Pb^{2+}$ ions from an aqueous solution, comprising:
   contacting, at a pH of 4-6, the aqueous solution with an adsorbent
   in the form of a powder or pellets,
   wherein the adsorbent comprises a cross-linked terpolymer comprising polycondensed units of phenol, a diaminoalkane and formaldehyde;
   wherein the diaminoalkane has a formula according to Formula 1:

(Formula 1)

with m, representing the number of carbon atoms in an alkyl chain, is 4, 6, or 8; and wherein each terminal amino group of the diaminoalkane unit bridges the aryl group of the phenol unit through a nitrogen-carbon-aryl linkage.

2. The method of claim 1, wherein the cross-linked terpolymer has a formula according to Formula 2:

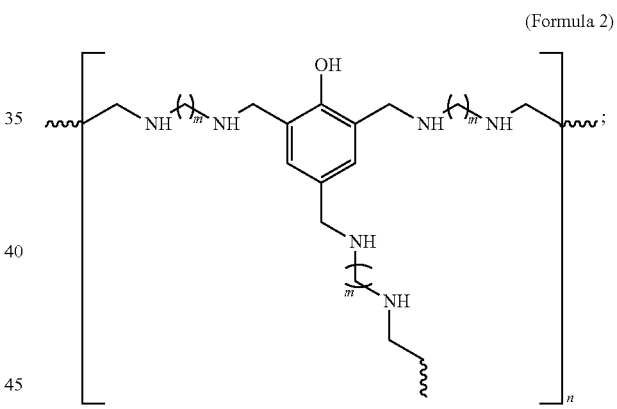

(Formula 2)

wherein n, representing the number of repeating units of the cross-linked terpolymer, is 10 to 10000.

3. The method of claim 1, wherein the phenol, diaminoalkane and formaldehyde are present in the cross-linked terpolymer at a molar ratio of 1:2.5-3:y, wherein y≥6.

4. The method of claim 1, wherein the cross linked terpolymer or a solid material synthesized therefrom adsorbent has a surface area of 0.01-0.15 m$^2$ g$^{-1}$.

5. The method of claim 1, wherein the cross-linked terpolymer has an average molecular weight of 1,500-350,000 g/mol.

6. The method of claim 1, wherein the contacting is carried out at a temperature of 25-50° C.

7. The method of claim 1, wherein the contacting is carried out at pH 5-6.

8. The method of claim 1, wherein the contacting is carried out for 1-5 h.

9. The method of claim 1, wherein the cross-linked terpolymer has a Pb$^{2+}$ adsorption capacity of at least 10 mg L$^{-1}$ based on the total volume of the aqueous solution.

10. The method of claim 1, wherein the cross-linked terpolymer has a $Pb^{2+}$ maximum adsorption capacity of 1-250 mg g$^{-1}$ based on the total weight of the cross-linked terpolymer.

11. The method of claim 1, wherein the contacting removes at least 85% of the $Pb^{2+}$ ions present in the aqueous solution.

12. The method of claim 1, wherein after contacting, one or more $Pb^{2+}$ ions are coordinated to one or more nitrogen atoms of the adsorbent.

13. The method of claim 1, further comprising removing at least one metal ion selected from the group consisting of Co, Cu, Zn, As, Sr, Mo, Cd and Hg from the aqueous solution.

* * * * *